(12) United States Patent
Kubota et al.

(10) Patent No.: US 10,754,126 B2
(45) Date of Patent: Aug. 25, 2020

(54) IMAGING LENS

(71) Applicant: Kantatsu Co., Ltd., Tochigi (JP)

(72) Inventors: Yoji Kubota, Nagano (JP); Kenichi Kubota, Tochigi (JP); Hitoshi Hirano, Tochigi (JP); Yoshio Ise, Tochigi (JP); Sayuri Noda, Tochigi (JP)

(73) Assignee: Kantatsu Co., Ltd., Tokyo (JP)

( * ) Notice: Subject to any disclaimer, the term of this patent is extended or adjusted under 35 U.S.C. 154(b) by 0 days.

(21) Appl. No.: 16/427,463

(22) Filed: May 31, 2019

(65) Prior Publication Data

US 2019/0285846 A1   Sep. 19, 2019

Related U.S. Application Data

(63) Continuation of application No. 15/933,710, filed on Mar. 23, 2018, now Pat. No. 10,338,343, which is a continuation of application No. 14/838,521, filed on Aug. 28, 2015, now Pat. No. 10,386,600, which is a continuation of application No. 13/905,570, filed on May 30, 2013, now Pat. No. 9,366,841.

(30) Foreign Application Priority Data

Jun. 21, 2012  (JP) .................................. 2012-139323
Nov. 8, 2012   (JP) .................................. 2012-245956

(51) Int. Cl.
*G02B 9/62*       (2006.01)
*G02B 13/00*      (2006.01)

(52) U.S. Cl.
CPC ........... *G02B 9/62* (2013.01); *G02B 13/0045* (2013.01)

(58) Field of Classification Search
CPC .... G02B 13/0045; G02B 13/04; G02B 13/18; G02B 13/005; G02B 9/62
USPC ........................................ 359/757–762, 713
See application file for complete search history.

(56) References Cited

U.S. PATENT DOCUMENTS

| 3,046,838 A | 7/1962 | Reiss |
| 4,389,099 A | 6/1983 | Imai |
| 4,702,568 A | 10/1987 | Okudaira |

(Continued)

FOREIGN PATENT DOCUMENTS

JP   2011-145315 A   7/2011

OTHER PUBLICATIONS

Ohara Inc, "S-TIM25." Ohara Inc: S-TIM/S-FTM, 2018, http://www.ohara-inc.co.jp/en/product/optical/dl/data/estim25.pdf.

*Primary Examiner* — Zachary W Wilkes
(74) *Attorney, Agent, or Firm* — Kubotera & Associates, LLC

(57) ABSTRACT

An imaging lens includes a first lens having positive refractive power; a second lens; a third lens; a fourth lens; a fifth lens having positive refractive power; and a sixth lens having negative refractive power, arranged from an object side to an image plane side. The fourth lens is formed in a shape so that a surface on the object side is concave and a surface on the image plane side is convex near an optical axis. The fifth lens is formed in a shape so that surfaces on the object side and the image plane side are convex near an optical axis. The sixth lens is formed in a shape so that surfaces on the object side and the image plane side are concave near an optical axis. The fifth lens and the sixth lens have specific focal lengths, and the fourth lens has a specific Abbe's number.

8 Claims, 24 Drawing Sheets

(56) References Cited

U.S. PATENT DOCUMENTS

| | | | |
|---|---|---|---|
| 4,812,027 A | 3/1989 | Yanagisawa | |
| 4,859,040 A | 8/1989 | Kitagishi et al. | |
| 7,933,078 B2 | 4/2011 | Jung et al. | |
| 8,432,619 B2 * | 4/2013 | Huang | G02B 13/0045 359/713 |
| 8,472,128 B2 * | 6/2013 | Huang | G02B 13/0045 359/713 |
| 8,514,499 B2 | 8/2013 | Hsu et al. | |
| 8,854,744 B2 | 10/2014 | Liao et al. | |
| 9,235,027 B2 * | 1/2016 | Chen | G02B 9/62 |
| 9,366,841 B2 | 6/2016 | Kubota et al. | |
| 2002/0048091 A1 | 4/2002 | Sato | |
| 2012/0257100 A1 | 10/2012 | Imaoka et al. | |
| 2014/0347745 A1 | 11/2014 | Shinohara | |
| 2018/0210171 A1 | 7/2018 | Kubota et al. | |

* cited by examiner

IMAGING LENS

CROSS-REFERENCE TO RELATED APPLICATIONS

This is a continuation application of a prior application Ser. No. 15/933,710, filed on Mar. 23, 2018, allowed, which is a continuation application of a prior application Ser. No. 14/838,521, filed on Aug. 28, 2015, allowed, which is a continuation application of a prior application Ser. No. 13/905,570, issued as U.S. Pat. No. 9,366,841 on Jun. 14, 2016.

BACKGROUND OF THE INVENTION AND RELATED ART STATEMENT

The present invention relates to an imaging lens for forming an image of an object on an imaging element such as a CCD sensor and a CMOS sensor, and particularly, it relates to an imaging lens suitable for mounting in a relatively small camera such as a built-in camera of a portable device including a cellular phone and portable information terminal, a digital still camera, a security camera, a vehicle onboard camera, and a network camera.

In these years, in place of cellular phones that are intended mainly for making phone calls, so-called "smartphones" have been more widely used, i.e., cellular phones with such functions as those of portable information terminals (PDA) and/or personal computers. Since the smartphones generally have more functions than those of the cellular phones, it is possible to use images taken by a camera thereof in various applications. For example, while it is possible to use the smartphones for printing and enjoying images taken, it is also possible to use images in other usage such as processing images to use for game characters or for makeup simulations, dress fitting simulations, and the others. The ways of the image usage were not conventionally common, however, it becomes more common mainly among young people Generally speaking, product groups of cellular phones and smartphones are often composed of products of various designs for the ones for beginners to the ones for advanced users. Among them, an imaging lens to be mounted in a product, which is developed for advanced users, is required to have a high resolution lens configuration so as to be also applicable to a high pixel count imaging element of these days. However, as the imaging lens to be mounted in a smartphone used for the above-described usages, it is critical to be a small size and has a wide angle of view, that is, a wide angle, than having a high resolution.

However, it is also true that even products for beginners require a certain degree of high resolution. In case of a lens configuration composed of six lenses, since the number of lenses that compose the imaging lens is many, although it is slightly disadvantageous for downsizing of the imaging lens, the degree of freedom upon designing is high, so that there is potential for achieving both satisfactory aberration correction and downsizing of the imaging lens in a well-balanced manner. As an imaging lens having the six-lens configuration, for example, an imaging lens described in Patent Reference has been known.

The imaging lens described in Patent Reference includes a first lens that is negative and has a shape of a meniscus lens directing a convex surface thereof to an object side; a bonded lens that is composed of two lenses, positive and negative lenses; a fourth lens that is positive; and a bonded lens that is composed of two lenses, positive and negative lenses, being arranged. According to the imaging lens described in Patent Reference, satisfying a conditional expression regarding a curvature radius of an object-side surface and an image plane-side surface of the first lens and a conditional expression regarding the two bonded lenses respectively, it is achievable to satisfactorily correct a distortion and a chromatic aberration. Patent Reference: Japanese Patent Application Publication No. 2011-145315

According to the imaging lens of Patent Reference, however, since a distance from an object-side surface of the first lens to an image plane of an imaging element is long, for mounting the imaging lens in a small-sized camera such as a cellular phone and a smartphone, it is necessary to dispose a prism or a mirror between the imaging lens and the image plane so as to bend a light path. High functionality and downsizing of cellular phones and smartphones are advanced every year, and the level of downsizing required for the imaging lens is even higher than before. With the lens configuration described in Patent Reference, it is difficult to attain satisfactory aberration correction while attaining downsizing of the imaging lens so as to meet the aforementioned demands.

Here, such an issue is not a problem specific to the imaging lens to be mounted in a cellular phones and smartphones, and rather, it is a common problem even for an imaging lens to be mounted in a relatively small camera such as digital still cameras, portable information terminals, security cameras, onboard cameras, and network cameras.

An object of the present invention is to provide an imaging lens that can satisfactorily correct aberrations. A further object of the present invention is to provide an imaging lens that can attain both downsizing of the imaging lens and satisfactory aberration correction.

Further objects and advantages of the present invention will be apparent from the following description of the present invention.

SUMMARY OF THE INVENTION

In order to attain the objects described above, according to a first aspect of the present invention, an imaging lens includes a first lens that has positive refractive power; a second lens that has negative refractive power; a third lens that has positive refractive power; a fourth lens that has negative refractive power; a fifth lens that has positive refractive power; and a sixth lens that has negative refractive power, arranged in the order from the object side to the image plane side. The first lens has an object side surface that has a positive curvature radius. The second lens has an object side surface and an image plane-side surface, both of which have positive curvature radii. The third lens has an object-side surface that has positive curvature radius and an image plane-side surface that has negative curvature radius. The fifth lens has an aspheric object-side surface having an inflexion point. The sixth lens has an aspheric image plane-side surface having an inflexion point. In addition, each of the first through the fourth lenses has weaker refractive power than each refractive power of the fifth and the sixth lenses.

According to the first aspect of the present invention, in the imaging lens, the fifth lens and the sixth lens are formed so as to have stronger refractive power than any other lenses, an object-side surface of the fifth lens is formed as an aspheric surface having an inflexion point, and an image plane-side surface of the sixth lens is formed as an aspheric shape having an inflexion point. For this reason, the fifth lens has positive refractive power near an optical axis, and has negative refractive power at the periphery. On the other hand, the sixth lens has negative refractive power near the optical axis and positive refractive power at the periphery. With this configuration, it is possible to satisfactorily correct a chromatic aberration near the optical axis and a spherical aberration, and also satisfactorily correct an off-axis chromatic aberration of magnification and a coma aberration. Here, since the arrangement of refractive powers of the first lens, the second lens, and the third lens is positive-negative-positive, the lens configuration of the imaging lens of the present invention is also advantageous for downsizing of the imaging lens while satisfactorily correcting aberrations.

According to a second aspect of the present invention, in the imaging lens having the above-described configuration, the fourth lens may be preferably formed in a shape such that curvature radii of the object-side surface thereof and the image plane-side surface thereof are both negative.

In addition, in the imaging lens having the above-described configuration, the fifth lens may be preferably formed in a shape such that a curvature radius of the object-side surface thereof is positive and a curvature radius of the image plane-side surface thereof is negative, and the sixth lens may be preferably formed in a shape such that a curvature radius of the object-side surface is negative and a curvature radius of the object-side surface thereof is positive.

According to a third aspect of the present invention, when the first lens has a focal length f1 and the second lens has a focal length f2, the imaging lens having the above-described configuration preferably satisfies the following conditional expression (1):

$$-1.5 < f1/f2 < -0.4 \qquad (1)$$

When the imaging lens satisfies the conditional expression (1), it is possible to satisfactorily correct a chromatic aberration and astigmatism and restrain a field curvature within a preferred range, while attaining downsizing of the imaging lens. When the value exceeds the upper limit of "−0.4", since the negative refractive power of the second lens is weak relative to positive refractive power of the first lens, it is advantageous for downsizing of the imaging lens. However, an axial chromatic aberration is insufficiently corrected (a focal position at a short wavelength moves to the object side relative to a focal position at a reference wavelength) and astigmatism increases, it is difficult to obtain satisfactory image-forming performance. Moreover, since periphery of an image-forming surface curves to the object side, it is difficult to restrain the field curvature within satisfactory range. On the other hand, when the value is below the lower limit of "−1.5", since the second lens has strong refractive power relative to the first lens, a position of an exit pupil moves to the object side and it is difficult to attain downsizing of the imaging lens. Furthermore, an axial chromatic aberration is excessively corrected (a focal position at a short wavelength moves to the image plane side relative to a focal position at a reference wavelength) and an off-axis chromatic aberration of magnification is excessively corrected (an image-forming point at a short wavelength moves in a direction to be away from the optical axis relative to an image-forming point at a reference wavelength). In addition, since astigmatism increases, also in this case, it is difficult to obtain satisfactory image-forming performance.

According to a fourth aspect of the present invention, when the whole lens system has a focal length f and the third lens has a focal length f3, the imaging lens having the above-described configuration preferably satisfies the following conditional expression (2):

$$0.5 < f3/f < 2.0 \qquad (2)$$

When the imaging lens satisfies the conditional expression (2), it is possible to satisfactorily correct astigmatism and restrain the field curvature within a satisfactory range while attaining downsizing of the imaging lens. When the value exceeds the upper limit of "2.0", since the third lens has weak refractive power relative to the refractive power of the whole lens system, periphery of the image-forming surface curves to the image plane side and it is difficult to restrain the field curvature within the satisfactory range. In addition, it is difficult to attain downsizing of the imaging lens. On the other hand, when the value is below the lower limit of "0.5", the third lens has strong refractive power relative to the refractive power of the whole lens system, astigmatic difference increases and it is difficult to obtain satisfactory image-forming performance.

According to a fifth aspect of the present invention, when the curvature radius of the object-side surface of the second lens is R2f and the curvature radius of the image plane-side surface of the second lens is R2r, the imaging lens having the above-described configuration preferably satisfies the following conditional expression (3):

$$0.4 < R2r/R2f < 0.8 \qquad (3)$$

When the imaging lens satisfies the conditional expression (3), it is possible to restrain the coma aberration, chromatic aberration, and the field curvature within preferred ranges in a balanced manner while attaining downsizing of the imaging lens. When the value exceeds the upper limit of "0.8", since the second lens has weak refractive power, although it is advantageous for downsizing of the imaging lens, the axial chromatic aberration is insufficiently corrected and an inner coma aberration occurs, so that it is difficult to obtain satisfactory image-forming performance. On the other hand, when the value is below the lower limit of "0.4", since a position of an exit pupil moves to the object side, although it is easy to restrain an incident angle of a light beam emitted from the imaging lens to an imaging element within a range that is set in advance, it is difficult to attain downsizing of the imaging lens. Moreover, since the axial chromatic aberration is excessively corrected and periphery of the image-forming surface curves to the image plane side, it is difficult to obtain satisfactory image-forming performance.

According to a sixth aspect of the present invention, when the whole lens system has the focal length f and the fourth lens has a focal length f4, the imaging lens having the above-described configuration preferably satisfies the following conditional expression (4):

$$-5.0 < f4/f < -1.0 \qquad (4)$$

When the imaging lens satisfies the conditional expression (4), it is possible to restrain the field curvature and the astigmatism within preferred ranges, while securing a back focal length. In many cases, an insert such as an infrared cut-off filter and a cover glass is disposed between the imaging lens and an image plane of an imaging element, so that it is necessary to have space to dispose such insert. When the value exceeds the upper limit of "−1.0", although it is easy to secure a back focal length, since periphery of the image-forming surface curves to the image plane side, it is difficult to obtain satisfactory image-forming performance. On the other hand, when the value is below the lower limit of "−5.0", the axial chromatic aberration is insufficiently corrected and the off-axis chromatic aberration of magnification is insufficiently corrected (the image-forming point at a short wavelength moves in a direction to be close to the optical axis relative to the image-forming point at a reference wavelength), so that it is difficult to obtain satisfactory image-forming performance. In addition, since periphery of the image-forming surface curves to the object side, it is difficult to restrain the field curvature within the preferred range.

According to a seventh aspect of the present invention, when the fifth lens has a focal length f5 and the sixth lens has a focal length f6, the imaging lens having the above-described configuration preferably satisfies the following conditional expression (5):

$$-2.0 < f5/f6 < -0.5 \quad (5)$$

When the imaging lens satisfies the conditional expression (5), it is possible to satisfactorily correct the field curvature and the chromatic aberration, while attaining downsizing of the imaging lens. As described above, according to the imaging lens of the present invention, the fifth lens has positive refractive power and the sixth lens has negative refractive power. When the value exceeds the upper limit of "−0.5", since the positive refractive power of the fifth lens is strong relative to the negative refractive power of the sixth lens, a position of the exit pupil moves to the object side and it is difficult to attain downsizing of the imaging lens. In addition, since periphery of the image-forming surface curves to the image plane side, it is difficult to obtain satisfactory image-forming performance. On the other hand, when the value is below the lower limit of "−2.0", the positive refractive power of the fifth lens is weak relative to the negative refractive power of the sixth lens, the position of the exit pupil moves to the image plane side, which is advantageous for downsizing of the imaging lens, but both the axial chromatic aberration and the off-axis chromatic aberration of magnification are insufficiently corrected, and it is difficult to obtain satisfactory image-forming performance. Furthermore, since periphery of the image-forming surface curves to the object side, it is difficult to restrain the field curvature within the satisfactory range.

According to an eighth aspect of the present invention, when the first lens has Abbe's number vd1, the third lens has Abbe's number vd3, the fifth lens has Abbe's number vd5, and the sixth lens has Abbe's number vd6, the imaging lens having the above-described configuration preferably satisfies the following conditional expressions (6) through (9):

$$45 < vd1 < 75 \quad (6)$$

$$45 < vd3 < 75 \quad (7)$$

$$45 < vd5 < 75 \quad (8)$$

$$45 < vd6 < 75 \quad (9)$$

When the imaging lens satisfies the conditional expressions (6) through (9), it is possible to satisfactorily correct the axial and the off-axis chromatic aberrations. Setting the Abbe's numbers of four lenses among the six lenses larger than the lower limit of "45", it is possible to effectively restrain the chromatic aberrations occurred in those four lenses, so that it is possible to suitably restrain the chromatic aberration of the whole lens system within a satisfactory range. In addition, setting Abbe's number of each lens smaller than the upper limit of "75", it is possible to restrain the cost of lens materials.

According to a ninth aspect of the present invention, in order to more satisfactorily correct the axial and the off-axis chromatic aberrations, when the second lens has the Abbe's number vd2 and the fourth lens has the Abbe's number vd4, the imaging lens having the above-described configuration preferably satisfies the following conditional expressions (10) and (11):

$$20 < vd2 < 40 \quad (10)$$

$$20 < vd4 < 40 \quad (11)$$

According to the imaging lens of the present invention, it is possible to provide an imaging lens with satisfactorily corrected aberrations. In addition, it is possible to provide a small-sized imaging lens especially suitable for mounting in a small-sized camera, while having high resolution with satisfactorily corrected aberrations.

DETAILED DESCRIPTION OF PREFERRED EMBODIMENTS

Hereunder, referring to the accompanying drawings, embodiments of the present invention will be fully described.

FIGS. 1, 4, 7, 10, 13, 16, 19 and 22 are schematic sectional views of imaging lenses in Numerical Data Examples 1 to 8 according to the embodiment, respectively. Since a basic lens configuration is the same among those Numerical Data Examples, the lens configuration of the embodiment will be described with reference to the illustrative sectional view of Numerical Data Example 1.

Figure 1:
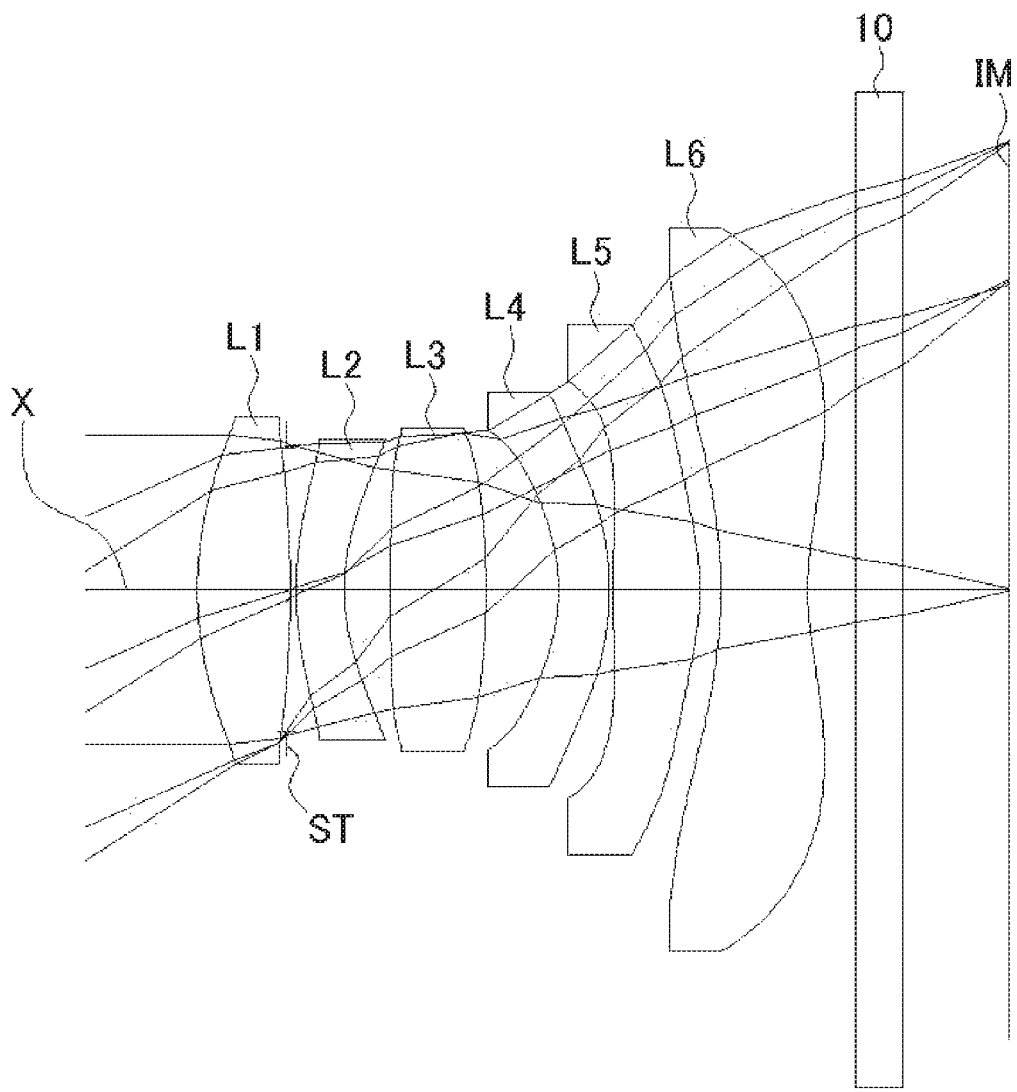
FIG. 1 shows a sectional view of a schematic configuration of an imaging lens in Numerical Data Example 1 according to an embodiment of the present invention.

As shown in FIG. 1, the imaging lens of the embodiment includes a first lens L1 having positive refractive power; a second lens L2 having negative refractive power; a third lens L3 having positive refractive power; a fourth lens L4 having negative refractive power; a fifth lens L5 having positive refractive power; and a sixth lens having negative refractive power, arranged in the order from an object side to an image plane side. There may be disposed a filter 10 between the sixth lens L6 and an image plane IM. The filter 10 can be also optionally omitted.

According to the imaging lens of the embodiment, the refractive power of each lens from the first lens L1 to the fourth lens L4 is set weaker than that of each lens from the fifth lens L5 and the sixth lens L6. In short, when the first lens L1 has a focal length f1, the second lens L2 has a focal length f2, the third lens L3 has a focal length f3, the fourth lens L4 has a focal length f4, the fifth lens L5 has a focal length f5, and the sixth lens L6 has a focal length f6, the imaging lens of the embodiment satisfies the relationship, "(f1, |f2|, f3, |f4|)>(f5, |f6|).

In addition, as shown in FIG. 1, an aperture stop ST is disposed between the first lens L1 and the second lens L2. According to the imaging lens of the embodiment, the position of the aperture stop ST is not limited. The imaging lenses of Numerical Data Examples 1 through 5 are examples, in which the aperture stop ST is disposed between the first lens L1 and the second lens L2, an example of so-called "mid aperture"-type lens configuration. On the other hand, the imaging lenses of Numerical Data Examples 6 through 8 are examples, in which the aperture stop ST is disposed on the object side of the first lens L1, an example of so-called "front aperture"-type lens configuration. According to the mid aperture-type lens configuration, since an effective diameter of the first lens L1 is long in comparison with the total optical length of the imaging lens, the presence of the imaging lens in the camera is emphasized, and it is possible to appeal to user's luxuriousness, high lens performances, etc. as a part of the camera design. On the other hand, in case of the front aperture-type lens configuration, it is possible to attain improvement of assembling performance of the imaging lens and reduction of manufacturing cost. Since the front aperture-type lens configuration also has a characteristic of being relatively easy to shorten the total optical length of the imaging lens, it is also an effective lens configuration for mounting in portable devices, such as cellular phones, smartphones that have been popular recently, etc.

According to the imaging lens having the above-described configuration, the first lens L1 is formed in a shape such that a curvature radius r1 of an object-side surface thereof is positive and a curvature radius r2 of an image plane-side surface is negative, so as to have a shape of a biconvex lens near an optical axis X. The shape of the first lens L1 is not limited to the one in Numerical Data Example 1. The shape of the first lens L1 can be any as long as the curvature radius r1 of the object-side surface thereof is positive, and can be a shape, in which the curvature radius r2 of the image plane-side surface is positive, i.e. a shape of a meniscus lens directing a convex surface thereof to the object side near the optical axis X.

The second lens L2 is formed in a shape such that a curvature radius r4 of an object-side surface thereof and a curvature radius r5 of an image plane-side surface thereof are both positive, and is formed as a shape of a meniscus lens directing a convex surface thereof to the object side near the optical axis X.

The third lens L3 is formed in a shape such that a curvature radius r6 of an object-side surface thereof is positive and a curvature radius r7 of an image plane-side surface is negative, and is formed as a shape of a biconvex lens near the optical axis X.

The fourth lens L4 is formed in a shape such that a curvature radius r8 of an object-side surface thereof and a curvature radius r9 of an image plane-side surface thereof are both negative, and is formed as a shape of a meniscus lens directing a concave surface thereof to the object side near the optical axis X. In addition to the shape, the shape of the fourth lens L4 can be a shape of meniscus lens directing a convex surface thereof to the object side near the optical axis X, or can be a shape of a biconcave lens near the optical axis X. The fourth lens L4 can be formed in various shapes as long as the refractive power is negative.

The fifth lens L5 is formed in a shape such that a curvature radius r10 of an object-side surface thereof is positive and a curvature radius r11 of an image plane-side surface thereof is negative, and is formed as a shape of a biconvex lens near the optical axis X. Among them, the object-side surface thereof is formed as an aspheric shape having an inflexion point. More specifically, the object-side surface of the fifth lens L5 is formed as an aspheric shape, so as to have positive refractive power near the optical axis X and have negative refractive power from near a position, where the ratio H of each image height to the maximum image height (hereinafter referred to as "image height ratio H") is 0.7, to periphery.

The sixth lens L6 is formed in a shape such that a curvature radius r12 of an object-side surface thereof is negative and a curvature radius r13 of an image plane-side surface thereof is positive, and is formed as a shape of a biconcave lens near the optical axis X. Among them, the image plane-side surface thereof is formed as an aspheric shape having an inflexion point. More specifically, the image plane-side surface of the sixth lens L6 is formed as an aspheric shape, so as to have negative refractive power near the optical axis X and have positive refractive power from near a position, where the image height ratio H is 0.7, to the periphery.

As described above, the fifth lens L5 and the sixth lens L6 have strong refractive powers relative to other lenses. Providing an inflexion point on the object-side surface of the fifth lens L5 and the image plane-side surface of the sixth lens L6 respectively, it is possible to satisfactorily correct a chromatic aberration near the optical axis and a spherical aberration, and also satisfactorily correct a coma aberration of an off-axis light flux and a chromatic aberration of magnification.

In addition, with those shapes of the fifth lens L5 and the sixth lens L6, it is possible to easily secure telecentric properties. As well known, an imaging element has a chief ray angle set in advance by its structure as a range of an incident angle of a light beam that can be taken in a sensor. According to the imaging lens of the embodiment, since the incident angle of a light beam emitted from the imaging lens to the image plane IM is restrained smaller than a chief ray angle, it is possible to suitably restrain generation of so-called shading phenomenon, a phenomenon of getting dark periphery in an image taken relative to the center part.

The imaging lens of the embodiment satisfies the following conditional expressions (1) to (11):

$$-1.5 < f1/f2 < -0.4 \quad (1)$$

$$0.5 < f3/f < 2.0 \quad (2)$$

$$0.4 < R2r/R2f < 0.8 \quad (3)$$

$$-5.0 < f4/f < -1.0 \quad (4)$$

$$-2.0 < f5/f6 < -0.5 \quad (5)$$

$$45 < vd1 < 75 \quad (6)$$

$$45 < vd3 < 75 \quad (7)$$

$$45 < vd5 < 75 \quad (8)$$

$$45 < vd6 < 75 \quad (9)$$

$$20 < vd2 < 40 \quad (10)$$

$$20 < vd4 < 40 \quad (11)$$

In the above conditional expressions:
f: Focal length of the whole lens system
f1: Focal length of a first lens L1
f2: Focal length of a second lens L2
f3: Focal length of a third lens L3
f4: Focal length of a fourth lens L4
f5: Focal length of a fifth lens L5
f6: Focal length of a sixth lens L6
R2f: Curvature radius of an object-side surface of the second lens L2
R2r: Curvature radius of an image plane-side surface of the second lens L2
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5
vd6: Abbe's number of the sixth lens L6

Here, it is not necessary to satisfy all of the conditional expressions, and it is achievable to obtain an effect corresponding to the respective conditional expression when any single one of the conditional expressions is individually satisfied.

In the embodiment, all lens surfaces of the first lens L1 to the third lens L3 are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index, and vd represents Abbe's number, respectively. Here, aspheric surfaces are indicated with surface numbers i affixed with * (asterisk).

Numerical Data Example 1

Basic lens data are shown below.
f = 4.44 mm, Fno = 2.3, ω = 32.7°
Unit: mm

Surface Data

| Surface Number i | r | d | nd | vd |
|---|---|---|---|---|
| (Object) | ∞ | ∞ | | |
| 1* | 2.298 | 0.589 | 1.5350 | 56.1 (=vd1) |
| 2* | -5.767 | -0.025 | | |
| 3 (Stop) | ∞ | 0.060 | | |
| 4* | 2.077 (=R2f) | 0.305 | 1.6355 | 24.0 (=vd2) |
| 5* | 1.279 (=R2r) | 0.292 | | |
| 6* | 20.522 | 0.606 | 1.5350 | 56.1 (=vd3) |
| 7* | -5.480 | 0.459 | | |
| 8* | -1.245 | 0.320 | 1.6142 | 26.0 (=vd4) |
| 9* | -1.904 | 0.024 | | |
| 10* | 7.260 | 0.549 | 1.5350 | 56.1 (=vd5) |
| 11* | -1.667 | 0.134 | | |
| 12* | -3.323 | 0.550 | 1.5350 | 56.1 (=vd6) |
| 13* | 1.783 | 0.300 | | |
| 14 | ∞ | 0.300 | 1.5168 | 64.2 |
| 15 | ∞ | 0.669 | | |
| (Image plane) | ∞ | | | | f1 = 3.14 mm
f2 = -6.10 mm
f3 = 8.12 mm
f4 = -7.12 mm
f5 = 2.58 mm
f6 = -2.08 mm

-continued

Basic lens data are shown below.
f = 4.44 mm, Fno = 2.3, ω = 32.7°
Unit: mm

Aspheric Surface Data

First Surface k = −3.633E−01, $A_4$ = −5.934E−03, $A_6$ = 8.824E−03, $A_8$ = −3.227E−02, $A_{10}$ = 2.020E−02, $A_{12}$ = 2.503E−03, $A_{14}$ = −8.051E−03
Second Surface k = −9.392E+01, $A_4$ = −3.476E−03, $A_6$ = −1.218E−02, $A_8$ = 3.560E−02, $A_{10}$ = −4.848E−02, $A_{12}$ = 8.882E−03, $A_{14}$ = 3.214E−03
Fourth Surface k = −9.984, $A_4$ = 1.580E−02, $A_6$ = −2.296E−02, $A_8$ = 4.445E−02, $A_{10}$ = −7.259E−02, $A_{12}$ = 7.597E−03, $A_{14}$ = 7.588E−03, $A_{16}$ = −2.978E−03
Fifth Surface k = −4.848, $A_4$ = 3.950E−02, $A_6$ = −1.582E−02, $A_8$ = −2.002E−02, $A_{10}$ = −7.693E−03, $A_{12}$ = 5.643E−04, $A_{14}$ = 1.799E−03, $A_{16}$ = 1.562E−03
Sixth Surface k = −8.770E+01, $A_4$ = 1.080E−02, $A_6$ = 1.625E−02, $A_8$ = −3.411E−03, $A_{10}$ = 3.710E−02, $A_{12}$ = −1.279E−02, $A_{14}$ = 2.855E−03, $A_{16}$ = 1.869E−03
Seventh Surface k = −5.087, $A_4$ = −2.262E−02, $A_6$ = 1.277E−02, $A_8$ = −7.512E−02, $A_{10}$ = 5.033E−02, $A_{12}$ = −6.250E−03, $A_{14}$ = −1.887E−03, $A_{16}$ = −1.276E−03
Eighth Surface k = 3.943E−01, $A_4$ = 2.364E−01, $A_6$ = −1.608E−01, $A_8$ = 1.211E−01, $A_{10}$ = −2.761E−02, $A_{12}$ = 5.954E−03, $A_{14}$ = 7.095E−03
Ninth Surface k = −7.050E−01, $A_4$ = −4.347E−02, $A_6$ = 4.604E−02, $A_8$ = 5.966E−03, $A_{10}$ = −9.041E−04, $A_{12}$ = −3.640E−03
Tenth Surface k = −3.949E+01, $A_4$ = −1.336E−01, $A_6$ = 4.439E−02, $A_8$ = −1.182E−02, $A_{10}$ = −2.409E−03, $A_{12}$ = −1.966E−03
Eleventh Surface k = −1.373E+01, $A_4$ = 3.197E−02, $A_6$ = −1.606E−02, $A_8$ = −2.189E−03, $A_{10}$ = 4.846E−04, $A_{12}$ = 1.757E−04
Twelfth Surface k = −3.655, $A_4$ = 2.248E−03, $A_6$ = 3.961E−03, $A_8$ = 9.349E−05, $A_{10}$ = −4.493E−05, $A_{12}$ = −4.198E−05, $A_{14}$ = 4.665E−07, $A_{16}$ = 1.121E−06
Thirteenth Surface k = −2.377E+01, $A_4$ = −4.720E−02, $A_6$ = 5.582E−03, $A_8$ = −6.809E−04, $A_{10}$ = 8.354E−06, $A_{12}$ = 7.206E−06, $A_{14}$ = 5.563E−07, $A_{16}$ = −3.472E−07

The values of the respective conditional expressions are as follows:

$f1/f2 = -0.52$ $f3/f = 1.83$ $R2r/R2f = 0.62$ $f4/f = -1.60$ $f5/f6 = -1.24$

Accordingly, the imaging lens of Numerical Data Example 1 satisfies the above-described respective conditional expressions. A distance on the optical axis X from the object-side surface of the first lens L1 to the image plane IM (length in air) is 5.03 mm, and downsizing of the imaging lens is attained.

Figure 2:
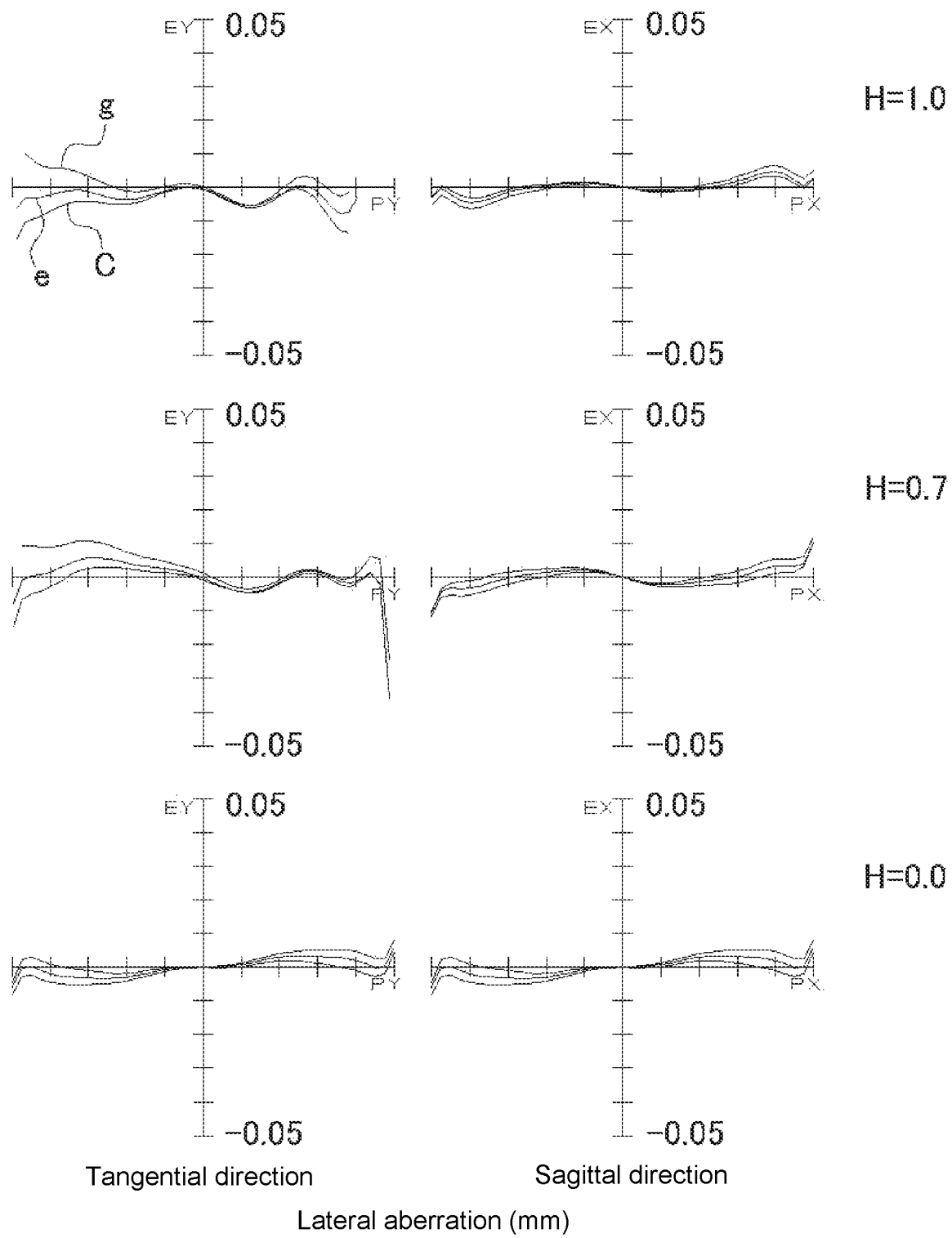
FIG. 2 is an aberration diagram showing a lateral aberration of the imaging lens of FIG. 1.
Figure 3:
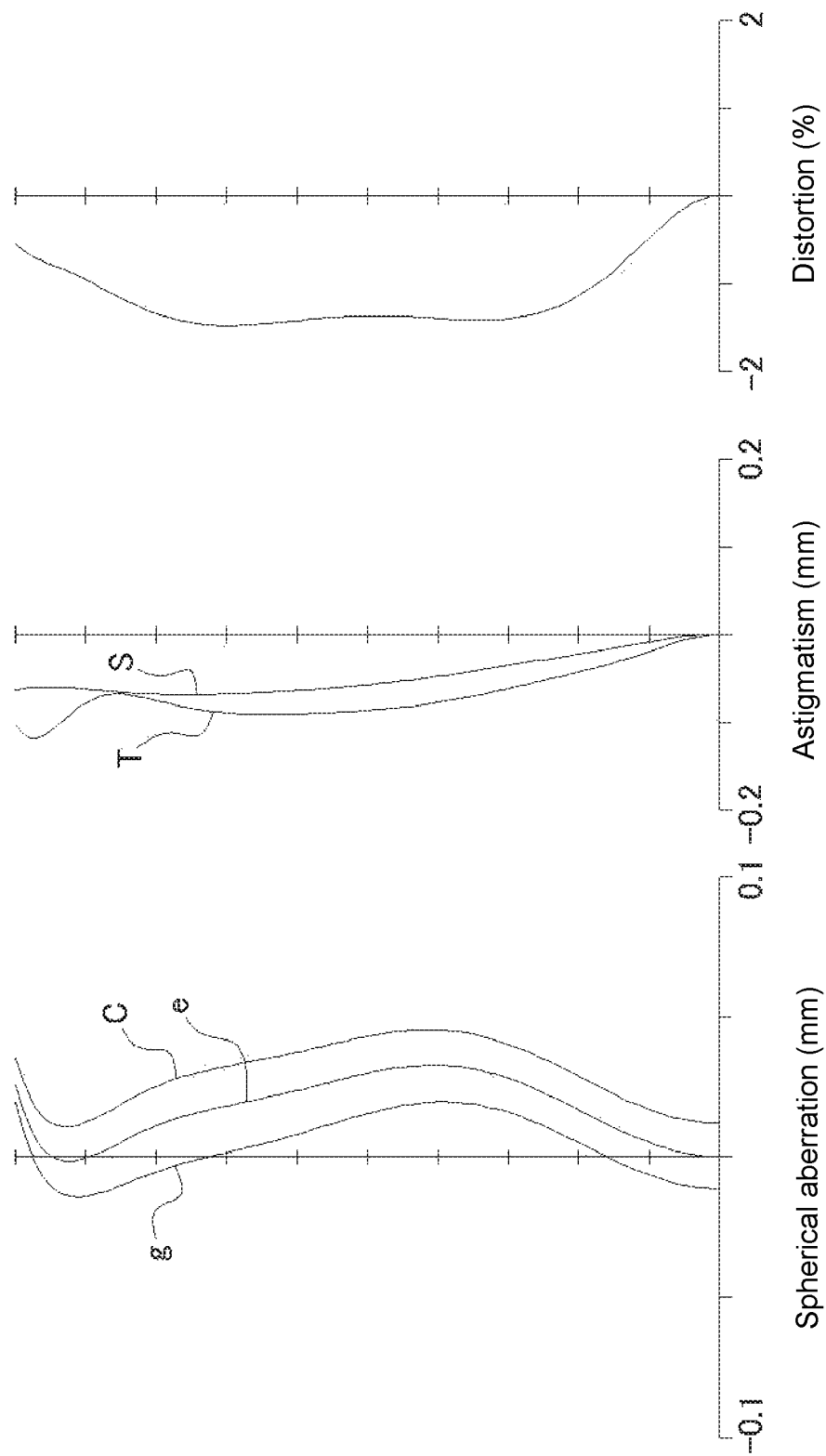
FIG. 3 is an aberration diagram showing a spherical aberration, astigmatism, and a distortion of the imaging lens of FIG. 1.
Figure 4:
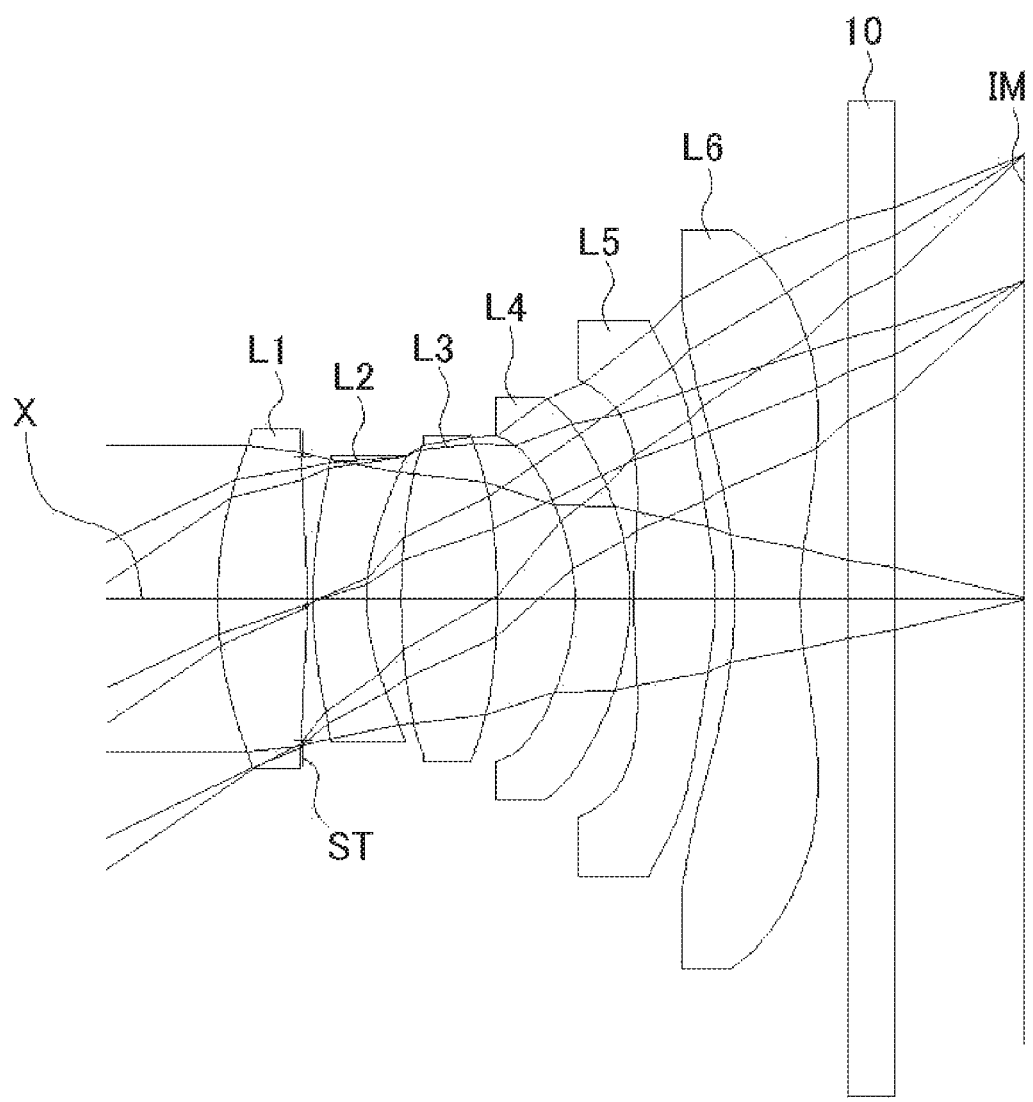
FIG. 4 shows a sectional view of a schematic configuration of an imaging lens in Numerical Data Example 2 according to the embodiment of the present invention.

FIG. 2 shows a lateral aberration that corresponds to the image height ratio H of, which is divided into a tangential direction and a sagittal direction (which is the same in FIGS. 5, 8, 11, 14, 17, 20 and 23), in the imaging lens of Numerical Data Example 1. Furthermore, FIG. 3 shows a spherical aberration (mm), astigmatism (mm), and a distortion (%), respectively, in the imaging lens of Numerical Data Example 1. In the aberration diagrams, for the lateral aberration diagrams and spherical aberration diagrams, aberrations at each wavelength, i.e. a g line (435.84 nm), an e line (546.07 nm), and a C line (656.27 nm) are indicated. In astigmatism diagram, an aberration on a sagittal image surface S and an aberration on a tangential image surface T are respectively indicated (which are the same in FIGS. 6, 9, 12, 15, 18, 21, and 24). As shown in FIGS. 2 and 3, according to the imaging lens of Numerical Data Example 1, the aberrations are satisfactorily corrected.

Numerical Data Example 2

Basic lens data are shown below.
f = 4.13 mm, Fno = 2.1, ω = 34.6°
Unit: mm

Surface Data

| Surface Number i | r | d | nd | vd |
|---|---|---|---|---|
| (Object) | ∞ | ∞ | | |
| 1* | 2.442 | 0.565 | 1.5350 | 56.1 (=vd1) |
| 2* | −5.109 | −0.025 | | |
| 3 (Stop) | ∞ | 0.063 | | |
| 4* | 2.787 (=R2f) | 0.339 | 1.6355 | 24.0 (=vd2) |
| 5* | 1.205 (=R2r) | 0.221 | | |
| 6* | 4.063 | 0.606 | 1.5350 | 56.1 (=vd3) |
| 7* | −4.223 | 0.493 | | |
| 8* | −1.252 | 0.347 | 1.6142 | 26.0 (=vd4) |
| 9* | −1.864 | 0.025 | | |
| 10* | 4.269 | 0.514 | 1.5350 | 56.1 (=vd5) |
| 11* | −1.899 | 0.124 | | |
| 12* | −3.182 | 0.415 | 1.5350 | 56.1 (=vd6) |
| 13* | 1.945 | 0.300 | | |
| 14 | ∞ | 0.300 | 1.5168 | 64.2 |
| 15 | ∞ | 0.815 | | |
| (Image plane) | ∞ | | | | f1 = 3.16 mm
f2 = −3.61 mm
f3 = 3.96 mm
f4 = −7.87 mm
f5 = 2.52 mm
f6 = −2.19 mm

Aspheric Surface Data

First Surface k = −5.302E−01, $A_4$ = −8.012E−03, $A_6$ = 1.071E−02, $A_8$ = −3.000E−02, $A_{10}$ = 2.012E−02, $A_{12}$ = 2.364E−03, $A_{14}$ = −6.570E−03
Second Surface k = −1.721E+02, $A_4$ = 1.874E−02, $A_6$ = −7.611E−03, $A_8$ = 3.263E−02, $A_{10}$ = −4.966E−02, $A_{12}$ = 1.001E−02, $A_{14}$ = 2.580E−03

-continued

Basic lens data are shown below.
f = 4.13 mm, Fno = 2.1, ω = 34.6°
Unit: mm

Fourth Surface k = −1.194E+01, $A_4$ = 9.143E−03, $A_6$ = −2.174E−02, $A_8$ = 5.124E−02, $A_{10}$ = −6.783E−02, $A_{12}$ = 7.778E−03, $A_{14}$ = 4.338E−03, $A_{16}$ = −8.002E−03
Fifth Surface k = −5.216, $A_4$ = 4.034E−02, $A_6$ = −1.310E−02, $A_8$ = −1.655E−02, $A_{10}$ = −3.910E−03, $A_{12}$ = 2.559E−03, $A_{14}$ = −5.434E−04, $A_{16}$ = −7.361E−03
Sixth Surface k = −1.295E+01, $A_4$ = 1.180E−02, $A_6$ = 1.303E−02, $A_8$ = −6.147E−03, $A_{10}$ = 3.480E−02, $A_{12}$ = −1.493E−02, $A_{14}$ = 9.846E−04, $A_{16}$ = 6.733E−04
Seventh Surface k = −3.238, $A_4$ = −2.248E−02, $A_6$ = 1.301E−02, $A_8$ = −7.431E−02, $A_{10}$ = 5.050E−02, $A_{12}$ = −6.288E−03, $A_{14}$ = −1.521E−03, $A_{16}$ = −1.611E−04
Eighth Surface k = 3.974E−01, $A_4$ = 2.419E−01, $A_6$ = −1.564E−01, $A_8$ = 1.215E−01, $A_{10}$ = −3.064E−02, $A_{12}$ = −7.119E−04, $A_{14}$ = 4.073E−03
Ninth Surface k = −4.369E−01, $A_4$ = −4.915E−02, $A_6$ = 4.233E−02, $A_8$ = 2.514E−03, $A_{10}$ = −3.558E−03, $A_{12}$ = −5.412E−03
Tenth Surface k = −1.742E+01, $A_4$ = −1.407E−01, $A_6$ = 3.999E−02, $A_8$ = −1.075E−02, $A_{10}$ = −1.509E−03, $A_{12}$ = −1.967E−03
Eleventh Surface k = −2.047E+01, $A_4$ = 3.303E−02, $A_6$ = −1.626E−02, $A_8$ = −2.318E−03, $A_{10}$ = 4.436E−04, $A_{12}$ = 1.642E−04
Twelfth Surface k = −3.169, $A_4$ = 1.486E−03, $A_6$ = 3.863E−03, $A_8$ = 9.200E−05, $A_{10}$ = −4.057E−05, $A_{12}$ = −3.995E−05, $A_{14}$ = 1.148E−06, $A_{16}$ = 1.324E−06
Thirteenth Surface k = −2.044E+01, $A_4$ = −4.467E−02, $A_6$ = 5.836E−03, $A_8$ = −6.978E−04, $A_{10}$ = 8.093E−06, $A_{12}$ = 8.086E−06, $A_{14}$ = 8.094E−07, $A_{16}$ = −2.979E−07

The values of the respective conditional expressions are as follows:

$f1/f2 = -0.88$ $f3/f = 0.96$ $R2r/R2f = 0.43$ $f4/f = -1.90$ $f5/f6 = -1.15$

Accordingly, the imaging lens of Numerical Data Example 2 satisfies the above-described respective conditional expressions. A distance on the optical axis X from the object-side surface of the first lens L1 to the image plane IM (length in air) is 5.00 mm, and downsizing of the imaging lens is attained.

Figure 5:
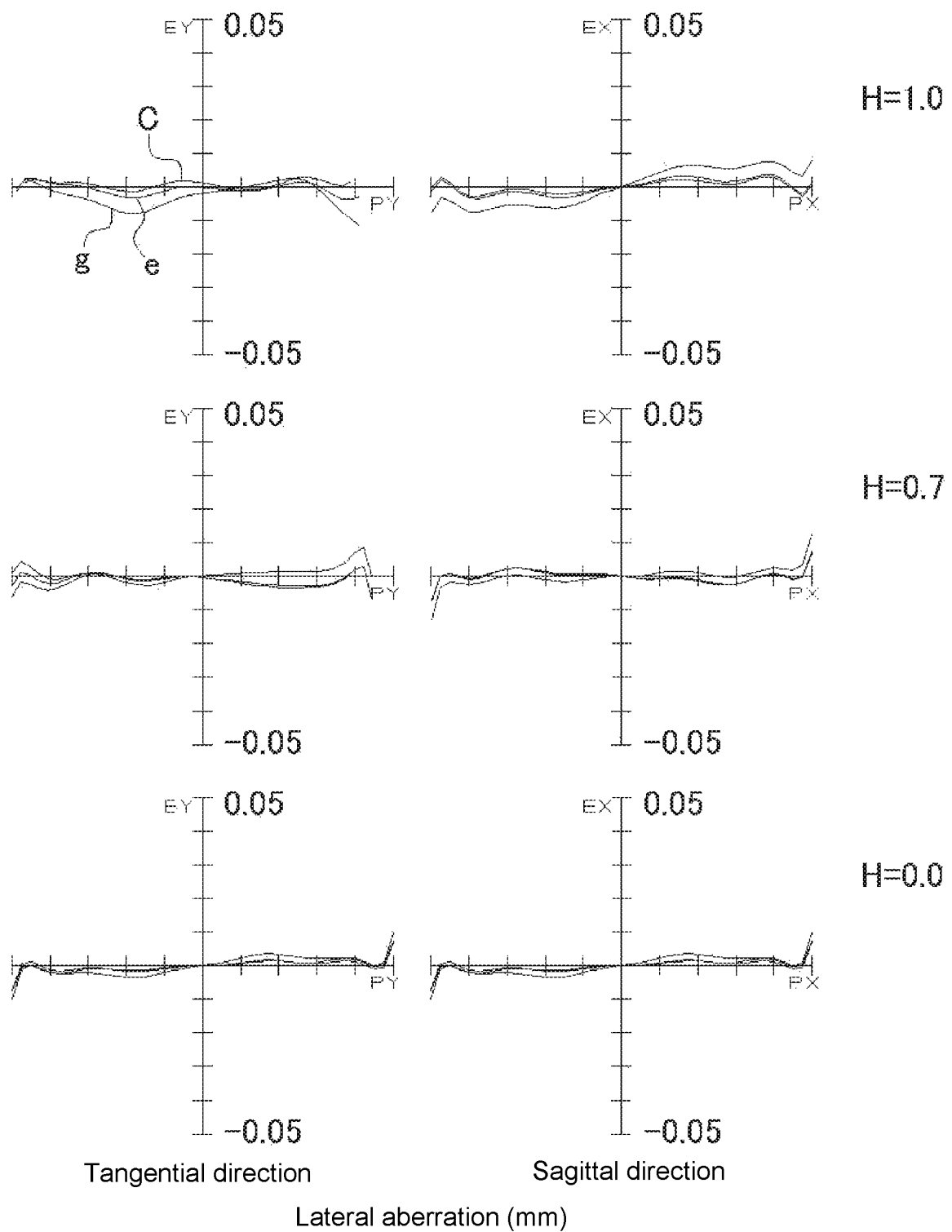
FIG. 5 is an aberration diagram showing a lateral aberration of the imaging lens of FIG. 4.
Figure 6:
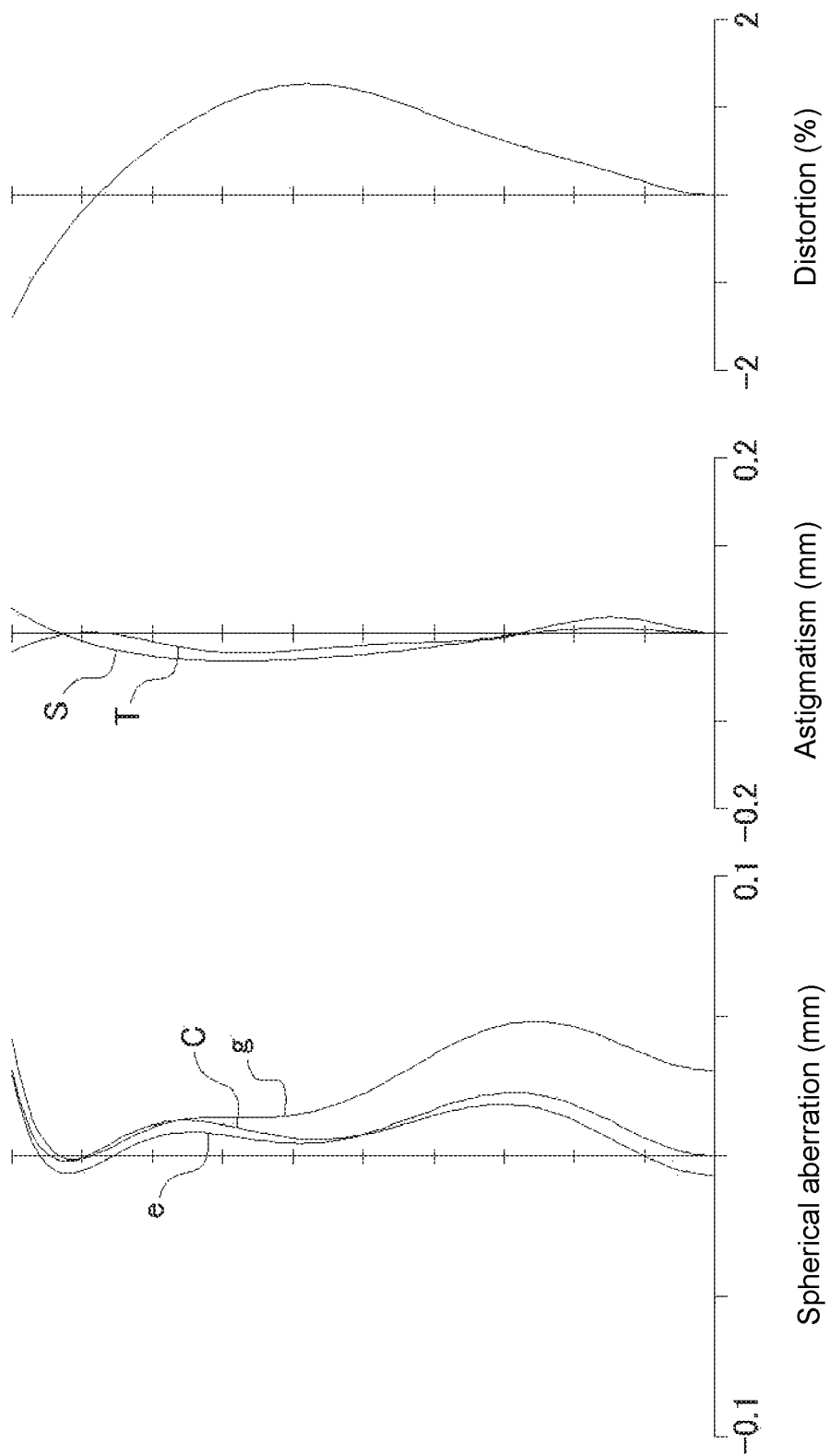
FIG. 6 is an aberration diagram showing a spherical aberration, astigmatism, and a distortion of the imaging lens of FIG. 4.
Figure 7:
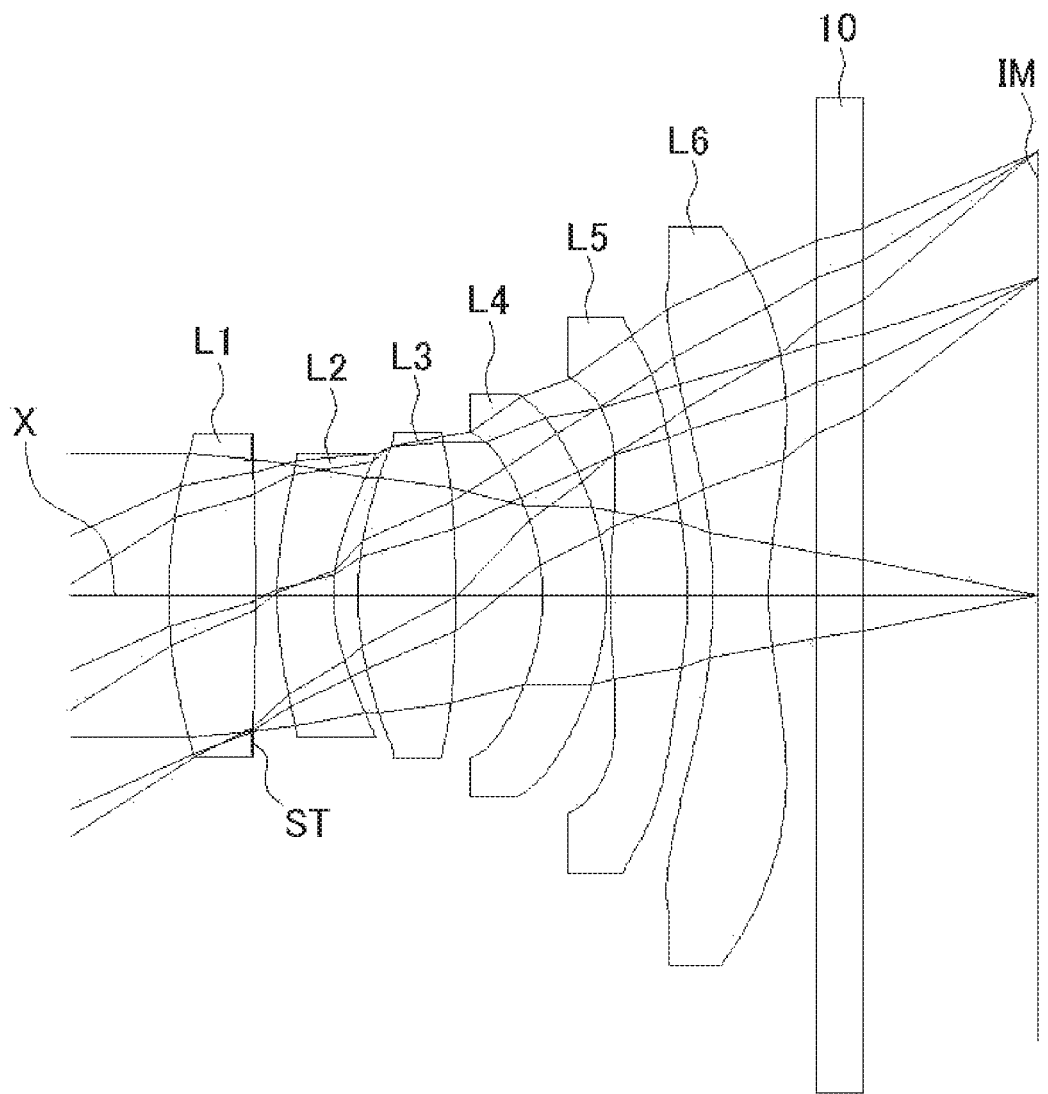
FIG. 7 shows a sectional view of a schematic configuration of an imaging lens in Numerical Data Example 3 according to the embodiment of the present invention.

FIG. 5 shows the lateral aberration that corresponds to the image height ratio H of the imaging lens of Numerical Data Example 2, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic lens data are shown below.
f = 4.40 mm, Fno = 2.5, ω = 33.0°
Unit: mm

Surface Data

| Surface Number i | r | d | nd | vd |
|---|---|---|---|---|
| (Object) | ∞ | ∞ | | |
| 1* | 3.116 | 0.551 | 1.5350 | 56.1 (=vd1) |
| 2* | −7.599 | −0.025 | | |
| 3 (Stop) | ∞ | 0.160 | | |
| 4* | 2.390 (=R2f) | 0.354 | 1.6355 | 24.0 (=vd2) |
| 5* | 1.004 (=R2r) | 0.156 | | |
| 6* | 1.789 | 0.619 | 1.5350 | 56.1 (=vd3) |
| 7* | −8.278 | 0.551 | | |
| 8* | −1.271 | 0.402 | 1.6142 | 26.0 (=vd4) |
| 9* | −1.843 | 0.023 | | |
| 10* | 3.656 | 0.492 | 1.5350 | 56.1 (=vd5) |
| 11* | −1.991 | 0.161 | | |
| 12* | −3.502 | 0.349 | 1.5350 | 56.1 (=vd6) |
| 13* | 1.956 | 0.300 | | |
| 14 | ∞ | 0.300 | 1.5168 | 64.2 |
| 15 | ∞ | 1.107 | | |
| (Image plane) | ∞ | | | | f1 = 4.19 mm
f2 = −3.00 mm
f3 = 2.80 mm
f4 = −9.03 mm
f5 = 2.48 mm
f6 = −2.29 mm

Aspheric Surface Data

First Surface k = −1.565E−01, $A_4$ = −6.190E−03, $A_6$ = 1.204E−02, $A_8$ = −3.110E−02, $A_{10}$ = 1.757E−02, $A_{12}$ = 1.462E−03, $A_{14}$ = −4.370E−03
Second Surface k = −3.933E+02, $A_4$ = 3.189E−02, $A_6$ = −1.100E−02, $A_8$ = 2.523E−02, $A_{10}$ = −5.143E−02, $A_{12}$ = 1.388E−02, $A_{14}$ = 4.468E−03
Fourth Surface k = −1.407E+01, $A_4$ = 1.397E−02, $A_6$ = −1.095E−02, $A_8$ = 5.538E−02, $A_{10}$ = −7.193E−02, $A_{12}$ = 2.032E−03, $A_{14}$ = 3.502E−03, $A_{16}$ = −2.582E−03
Fifth Surface k = −5.132, $A_4$ = 3.611E−02, $A_6$ = −1.233E−02, $A_8$ = −1.242E−02, $A_{10}$ = −2.266E−03, $A_{12}$ = −6.220E−04, $A_{14}$ = −6.606E−03, $A_{16}$ = −1.153E−02
Sixth Surface k = −7.612, $A_4$ = 1.627E−02, $A_6$ = 1.227E−02, $A_8$ = −6.782E−03, $A_{10}$ = 3.400E−02, $A_{12}$ = −1.660E−02, $A_{14}$ = −1.613E−03, $A_{16}$ = −2.404E−03
Seventh Surface k = −1.988E+01, $A_4$ = −1.612E−02, $A_6$ = 1.547E−02, $A_8$ = −7.175E−02, $A_{10}$ = 5.162E−02, $A_{12}$ = −6.116E−03, $A_{14}$ = −1.470E−03, $A_{16}$ = 2.681E−04
Eighth Surface k = 3.845E−01, $A_4$ = 2.391E−01, $A_6$ = −1.544E−01, $A_8$ = 1.264E−01, $A_{10}$ = −2.749E−02, $A_{12}$ = −5.408E−03, $A_{14}$ = −5.930E−03

Basic lens data are shown below.
f = 4.40 mm, Fno = 2.5, ω = 33.0°
Unit: mm

Ninth Surface k = −4.583E−01, $A_4$ = −4.857E−02, $A_6$ = 4.264E−02, $A_8$ = 2.085E−03, $A_{10}$ = −4.194E−03, $A_{12}$ = −5.846E−03
Tenth Surface k = −7.810, $A_4$ = −1.355E−01, $A_6$ = 3.890E−02, $A_8$ = −1.125E−02, $A_{10}$ = −1.195E−03, $A_{12}$ = −1.604E−03
Eleventh Surface k = −2.485E+01, $A_4$ = 3.149E−02, $A_6$ = −1.625E−02, $A_8$ = −2.313E−03, $A_{10}$ = 4.426E−04, $A_{12}$ = 1.640E−04
Twelfth Surface k = −3.227, $A_4$ = 1.364E−03, $A_6$ = 3.790E−03, $A_8$ = 8.474E−05, $A_{10}$ = −3.919E−05, $A_{12}$ = −3.888E−05, $A_{14}$ = 1.597E−06, $A_{16}$ = 1.480E−06
Thirteenth Surface k = −2.078E+01, $A_4$ = −4.456E−02, $A_6$ = 6.050E−03, $A_8$ = −6.680E−04, $A_{10}$ = 1.251E−05, $A_{12}$ = 8.848E−06, $A_{14}$ = 9.305E−07, $A_{16}$ = −2.851E−07

The values of the respective conditional expressions are as follows:

$f1/f2 = -1.40$ $f3/f = 0.64$ $R2r/R2f = 0.42$ $f4/f = -2.05$ $f5/f6 = -1.08$

Accordingly, the imaging lens of Numerical Data Example 3 satisfies the above-described respective conditional expressions. A distance on the optical axis X from the object-side surface of the first lens L1 to the image plane IM (length in air) is 5.04 mm, and downsizing of the imaging lens is attained.

Figure 8:
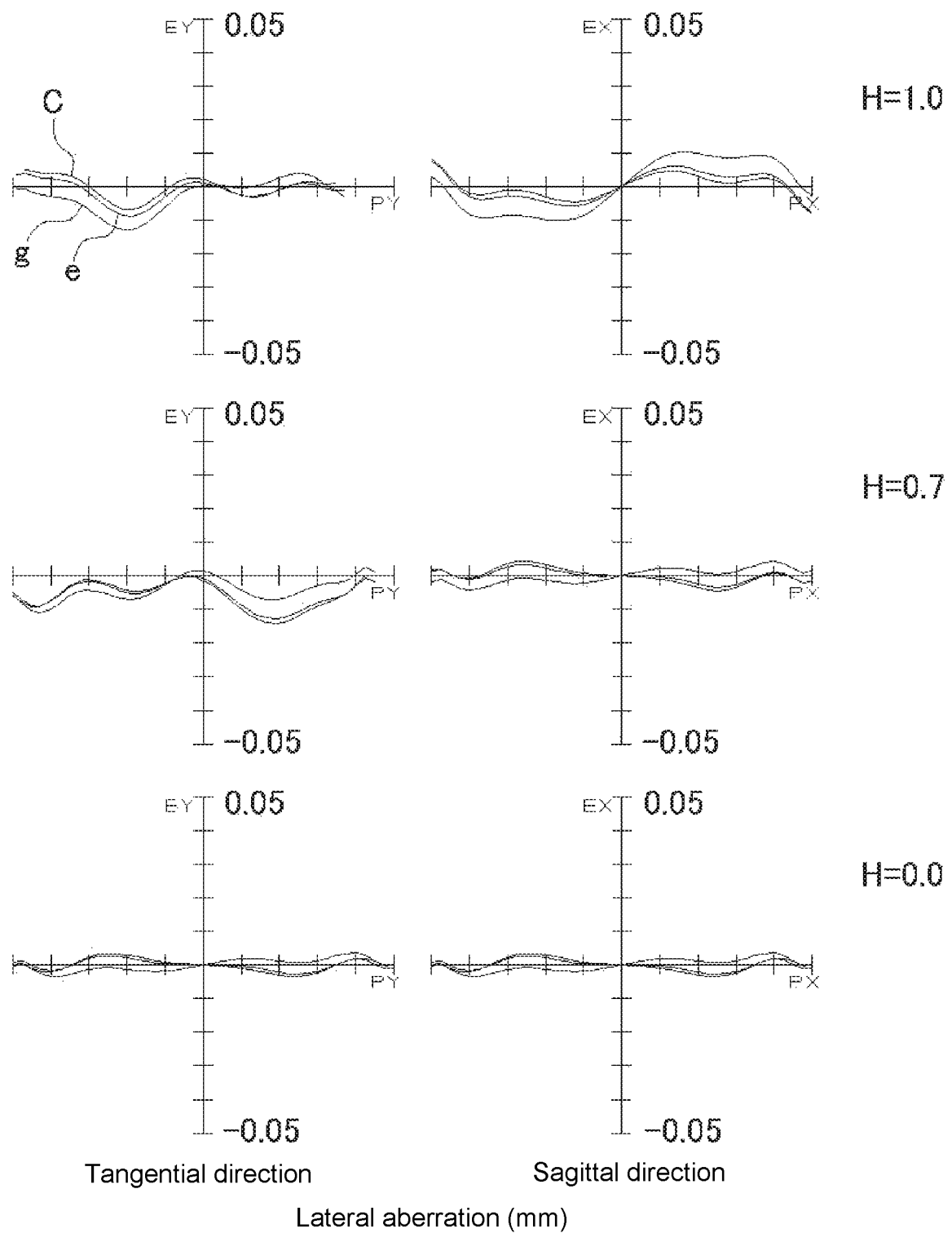
FIG. 8 is an aberration diagram showing a lateral aberration of the imaging lens of FIG. 7.
Figure 9:
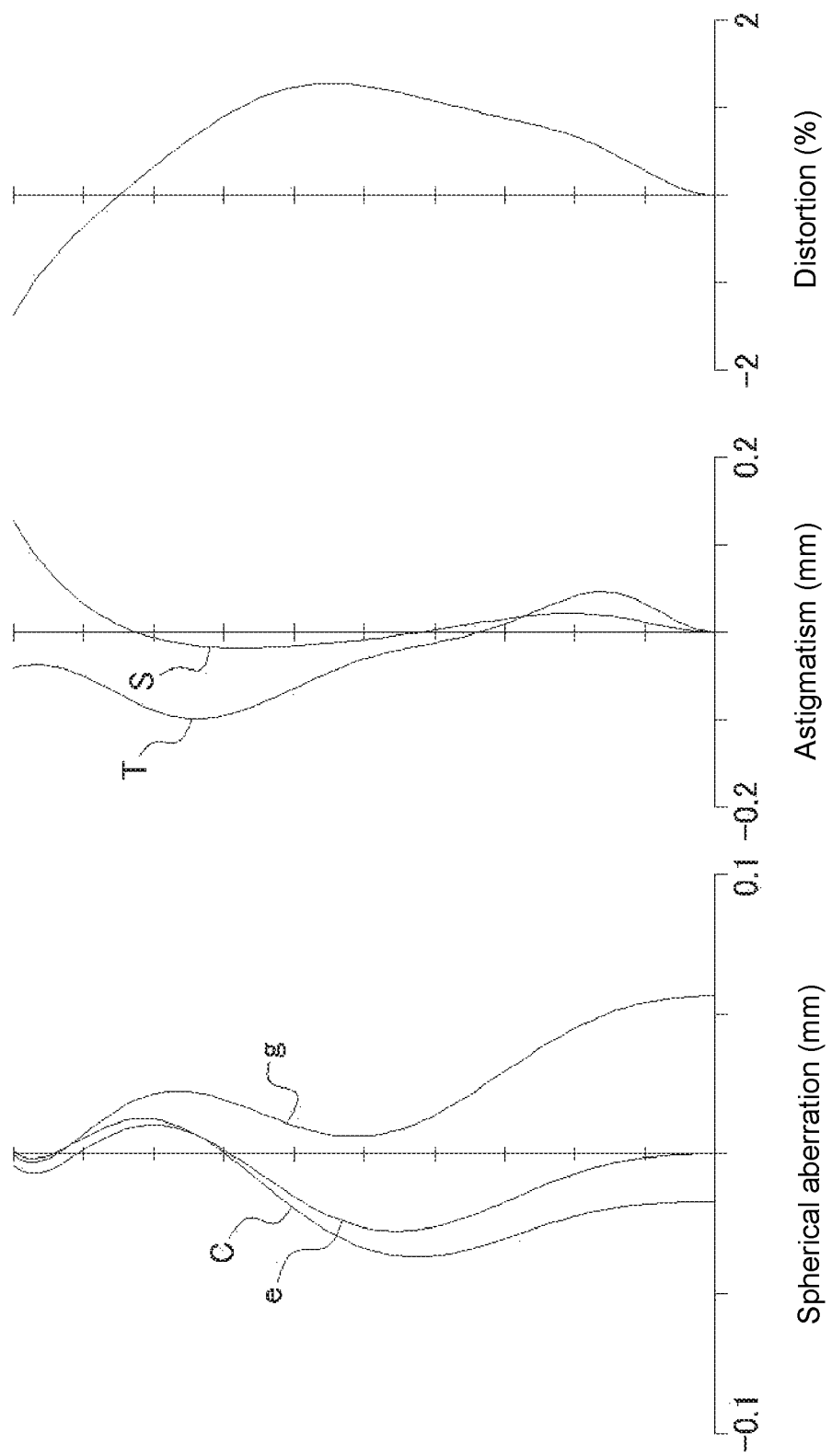
FIG. 9 is an aberration diagram showing a spherical aberration, astigmatism, and a distortion of the imaging lens of FIG. 7.
Figure 10:
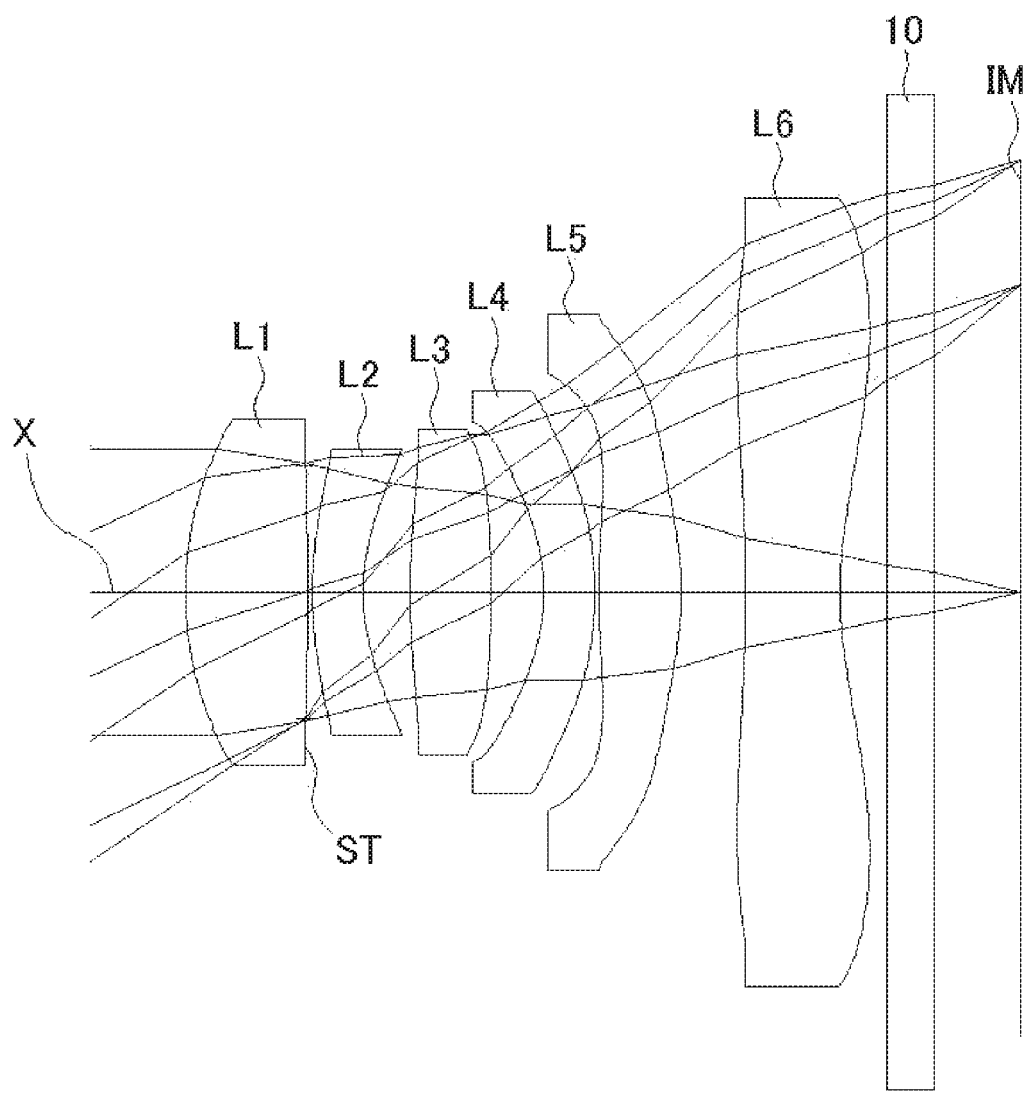
FIG. 10 shows a sectional view of a schematic configuration of an imaging lens in Numerical Data Example 4 according to the embodiment of the present invention.

FIG. 8 shows the lateral aberration that corresponds to the image height ratio H of the imaging lens of Numerical Data Example 3 and FIG. 9 shows a spherical aberration (mm), astigmatism (mm), and a distortion (%), respectively. As shown in FIGS. 8 and 9, according to the imaging lens of Numerical Data Example 3, the aberrations are satisfactorily corrected.

Numerical Data Example 4

Basic lens data are shown below.
f = 4.04 mm, Fno = 2.2, ω = 34.3°

Surface Data

| Surface Number i | r | d | nd | vd |
|---|---|---|---|---|
| (Object) | ∞ | ∞ | | |
| 1* | 2.199 | 0.779 | 1.5350 | 56.1 (=vd1) |
| 2* | −6.189 | −0.025 | | |
| 3 (Stop) | ∞ | 0.050 | | |
| 4* | 2.689 (=R2f) | 0.320 | 1.6355 | 24.0 (=vd2) |
| 5* | 1.262 (=R2r) | 0.299 | | |
| 6* | 5.128 | 0.511 | 1.5350 | 56.1 (=vd3) |
| 7* | −8.502 | 0.335 | | |
| 8* | −1.242 | 0.320 | 1.6142 | 26.0 (=vd4) |
| 9* | −2.587 | 0.025 | | |
| 10* | 3.890 | 0.525 | 1.5350 | 56.1 (=vd5) |
| 11* | −2.019 | 0.405 | | |
| 12* | −11.016 | 0.596 | 1.5350 | 56.1 (=vd6) |
| 13* | 2.423 | 0.300 | | |
| 14 | ∞ | 0.300 | 1.5168 | 64.2 |
| 15 (Image plane) | ∞ | 0.547 | | | f1 = 3.12 mm
f2 = −4.06 mm
f3 = 6.04 mm
f4 = −4.24 mm
f5 = 2.56 mm
f6 = −3.64 mm

Aspheric Surface Data

First Surface k = 1.124E−02, $A_4$ = −4.401E−04, $A_6$ = 1.420E−02, $A_8$ = −2.080E−02, $A_{10}$ = 1.444E−02, $A_{12}$ = −1.066E−03, $A_{14}$ = −2.248E−03
Second Surface k = −2.482E+02, $A_4$ = 4.370E−02, $A_6$ = −1.229E−02, $A_8$ = 1.493E−02, $A_{10}$ = −5.074E−02, $A_{12}$ = 3.718E−02, $A_{14}$ = −1.202E−02
Fourth Surface k = −8.863, $A_4$ = −9.672E−04, $A_6$ = 1.480E−03, $A_8$ = 5.133E−02, $A_{10}$ = −1.195E−01, $A_{12}$ = −9.295E−03, $A_{14}$ = 1.252E−01, $A_{16}$ = −7.653E−02
Fifth Surface k = −5.543, $A_4$ = 4.950E−02, $A_6$ = −7.857E−03, $A_8$ = −2.161E−02, $A_{10}$ = −5.836E−04, $A_{12}$ = −2.489E−03, $A_{14}$ = −8.496E−03, $A_{16}$ = −1.298E−03
Sixth Surface k = −9.334, $A_4$ = −2.684E−02, $A_6$ = −3.815E−03, $A_8$ = −5.982E−03, $A_{10}$ = 1.708E−03, $A_{12}$ = −1.119E−02, $A_{14}$ = 4.147E−02, $A_{16}$ = −3.250E−02
Seventh Surface k = −2.928E+01, $A_4$ = −4.035E−02, $A_6$ = −3.454E−03, $A_8$ = −6.219E−02, $A_{10}$ = 4.593E−02, $A_{12}$ = −2.243E−03, $A_{14}$ = −1.296E−02, $A_{16}$ = −6.031E−03
Eighth Surface k = 2.439E−01, $A_4$ = 2.058E−01, $A_6$ = −9.988E−02, $A_8$ = 8.197E−02, $A_{10}$ = 1.409E−01, $A_{12}$ = −1.809E−01, $A_{14}$ = 6.322E−02
Ninth Surface k = 2.831E−01, $A_4$ = −1.309E−01, $A_6$ = 8.644E−02, $A_8$ = 7.415E−03, $A_{10}$ = −2.020E−04, $A_{12}$ = −7.082E−03
Tenth Surface k = −5.245E+01, $A_4$ = −9.165E−02, $A_6$ = 3.480E−02, $A_8$ = −2.605E−02, $A_{10}$ = −2.253E−04, $A_{12}$ = −6.047E−05
Eleventh Surface k = −8.364, $A_4$ = 8.440E−02, $A_6$ = −4.622E−02, $A_8$ = −2.391E−04, $A_{10}$ = 1.717E−03, $A_{12}$ = 2.658E−07
Twelfth Surface k = 3.347, $A_4$ = 9.551E−03, $A_6$ = 8.061E−05, $A_8$ = 1.356E−06, $A_{10}$ = 3.115E−05, $A_{12}$ = −6.982E−06, $A_{14}$ = 1.049E−08, $A_{16}$ = −1.186E−09

Basic lens data are shown below.
f = 4.04 mm, Fno = 2.2, ω = 34.3°

Thirteenth Surface k = −1.362E+01, $A_4$ = −2.176E−02, $A_6$ = 3.296E−03, $A_8$ = −6.541E−04, $A_{10}$ = 6.974E−05, $A_{12}$ = 1.396E−07, $A_{14}$ = 2.866E−08, $A_{16}$ = −7.799E−08

The values of the respective conditional expressions are as follows:

$f1/f2$=−0.77

$f3/f$=1.50

$R2r/R2f$=0.47

$f4/f$=−1.05

$f5/f6$=−0.70

Accordingly, the imaging lens of Numerical Data Example 4 satisfies the above-described conditional expressions. A distance on the optical axis X from the object-side surface of the first lens L1 to the image plane IM (length in air) is 5.18 mm, and downsizing of the imaging lens is attained.

Figure 11:
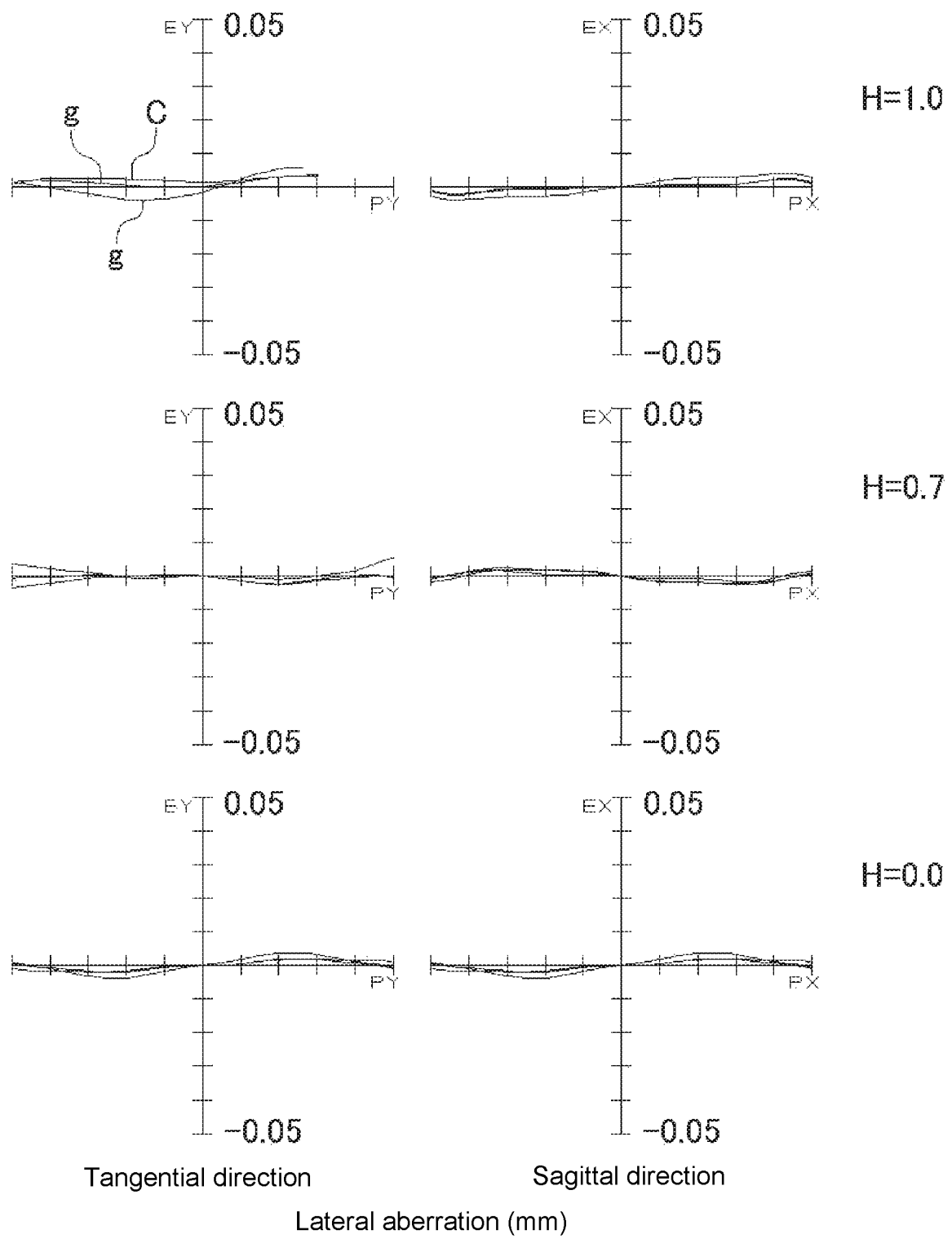
FIG. 11 is an aberration diagram showing a lateral aberration of the imaging lens of FIG. 10.
Figure 12:
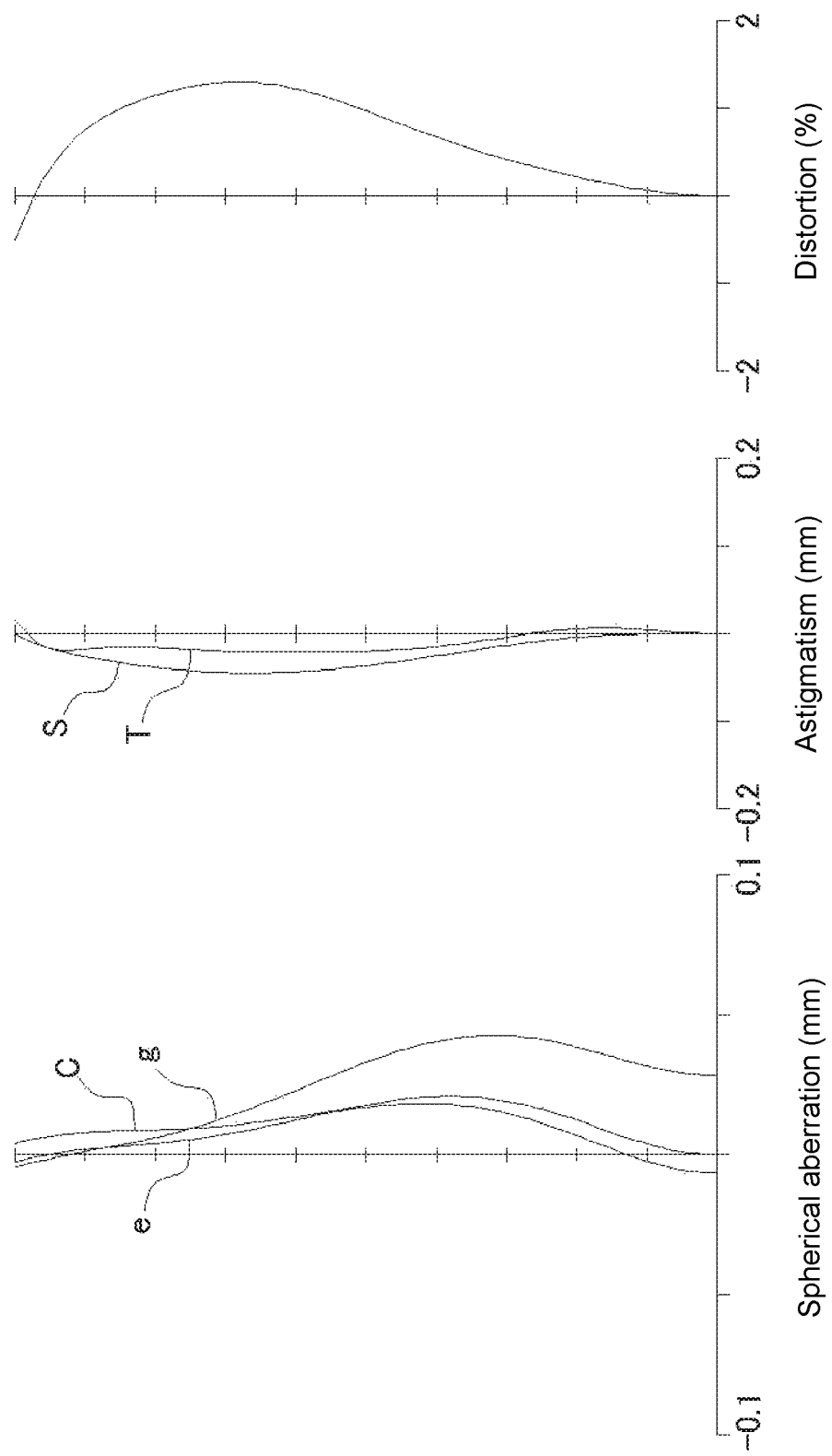
FIG. 12 is an aberration diagram showing a spherical aberration, astigmatism, and a distortion of the imaging lens of FIG. 10.
Figure 13:
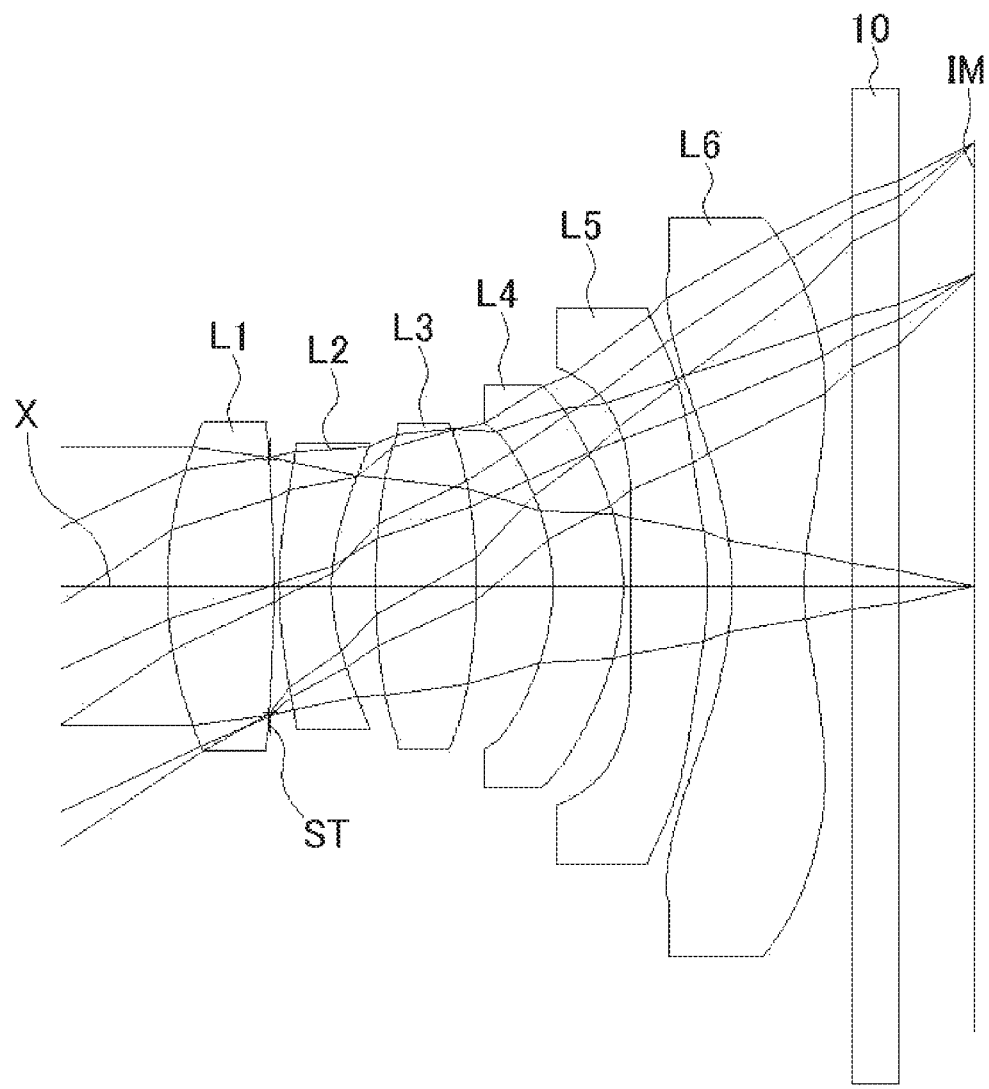
FIG. 13 shows a sectional view of a schematic configuration of an imaging lens in Numerical Data Example 5 according to the embodiment of the present invention.

FIG. 11 shows the lateral aberration that corresponds to the image height ratio H of the imaging lens of Numerical Data Example 4 and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic lens data are shown below.
f = 5.11 mm, Fno = 2.4, ω = 29.2°
Unit: mm

Surface Data

| Surface Number i | r | d | nd | vd |
|---|---|---|---|---|
| (Object) | ∞ | ∞ | | |
| 1* | 2.377 | 0.676 | 1.5350 | 56.1 (=vd1) |
| 2* | −5.200 | −0.025 | | |
| 3 (Stop) | ∞ | 0.058 | | |
| 4* | 2.813 (=R2f) | 0.331 | 1.6355 | 24.0 (=vd2) |
| 5* | 1.243 (=R2r) | 0.276 | | |
| 6* | 3.821 | 0.639 | 1.5350 | 56.1 (=vd3) |
| 7* | −3.725 | 0.485 | | |
| 8* | −1.298 | 0.444 | 1.6142 | 26.0 (=vd4) |
| 9* | −1.703 | 0.044 | | |
| 10* | 6.979 | 0.491 | 1.5350 | 56.1 (=vd5) |
| 11* | −2.025 | 0.153 | | |
| 12* | −2.228 | 0.458 | 1.5350 | 56.1 (=vd6) |
| 13* | 1.576 | 0.300 | | |
| 14 | ∞ | 0.300 | 1.5168 | 64.2 |
| 15 | ∞ | 0.480 | | |
| (Image plane) | ∞ | | | |

Basic lens data are shown below.
f = 5.11 mm, Fno = 2.4, ω = 29.2°
Unit: mm f1 = 3.14 mm
f2 = −3.78 mm
f3 = 3.62 mm
f4 = −15.15 mm
f5 = 2.98 mm
f6 = −1.65 mm Aspheric Surface Data First Surface k = 6.361E−01, $A_4$ = −1.556E−02, $A_6$ = 9.451E−03, $A_8$ = −2.615E−02, $A_{10}$ = 1.806E−02, $A_{12}$ = −2.202E−03, $A_{14}$ = −3.359E−03
Second Surface k = −1.571E+02, $A_4$ = 3.246E−02, $A_6$ = −2.819E−02, $A_8$ = 3.412E−02, $A_{10}$ = −4.488E−02, $A_{12}$ = 1.625E−02, $A_{14}$ = −6.549E−03
Fourth Surface k = −1.246E+01, $A_4$ = 6.725E−03, $A_6$ = −2.724E−02, $A_8$ = 5.080E−02, $A_{10}$ = −6.620E−02, $A_{12}$ = 2.141E−03, $A_{14}$ = 1.405E−02, $A_{16}$ = −1.678E−02
Fifth Surface k = −5.543, $A_4$ = 4.034E−02, $A_6$ = −1.188E−02, $A_8$ = −1.632E−02, $A_{10}$ = −4.001E−03, $A_{12}$ = 4.135E−03, $A_{14}$ = 2.756E−03, $A_{16}$ = −1.429E−02
Sixth Surface k = −9.478, $A_4$ = 1.333E−02, $A_6$ = 1.557E−02, $A_8$ = −6.051E−03, $A_{10}$ = 3.119E−02, $A_{12}$ = −1.604E−02, $A_{14}$ = −1.345E−03, $A_{16}$ = 2.909E−05
Seventh Surface k = −4.724, $A_4$ = −2.092E−02, $A_6$ = 1.808E−02, $A_8$ = −6.883E−02, $A_{10}$ = 5.291E−02, $A_{12}$ = −6.852E−03, $A_{14}$ = −3.649E−03, $A_{16}$ = −3.191E−03
Eighth Surface k = 3.981E−01, $A_4$ = 2.239E−01, $A_6$ = −1.615E−01, $A_8$ = 1.293E−01, $A_{10}$ = −2.130E−02, $A_{12}$ = −2.284E−03, $A_{14}$ = −6.718E−03
Ninth Surface k = −6.381E−01, $A_4$ = −3.614E−02, $A_6$ = 4.160E−02, $A_8$ = 2.348E−03, $A_{10}$ = −2.639E−03, $A_{12}$ = −4.504E−03
Tenth Surface k = −1.362E+02, $A_4$ = −1.384E−01, $A_6$ = 3.837E−02, $A_8$ = −1.130E−02, $A_{10}$ = −1.896E−03, $A_{12}$ = −1.949E−03
Eleventh Surface k = −2.204E+01, $A_4$ = 3.281E−02, $A_6$ = −1.605E−02, $A_8$ = −2.211E−03, $A_{10}$ = 4.763E−04, $A_{12}$ = 1.740E−04
Twelfth Surface k = −3.541, $A_4$ = 2.692E−03, $A_6$ = 4.027E−03, $A_8$ = 1.108E−04, $A_{10}$ = −3.741E−05, $A_{12}$ = −3.847E−05, $A_{14}$ = 1.508E−06, $A_{16}$ = 1.459E−06
Thirteenth Surface k = −2.034E+01, $A_4$ = −4.208E−02, $A_6$ = 5.939E−03, $A_8$ = −6.706E−04, $A_{10}$ = 1.254E−05, $A_{12}$ = 8.551E−06, $A_{14}$ = 8.188E−07, $A_{16}$ = −3.043E−07

The values of the respective conditional expressions are as follows:

$f1/f2$=−0.83

$f3/f$=0.71

$R2r/R2f$=0.44

$f4/f$=−2.97

$f5/f6$=−1.81

Accordingly, the imaging lens of Numerical Data Example 5 satisfies the above-described respective conditional expressions. A distance on the optical axis X from the object-side surface of the first lens L1 to the image plane IM (length in air) is 5.01 mm, and downsizing of the imaging lens is attained.

Figure 14:
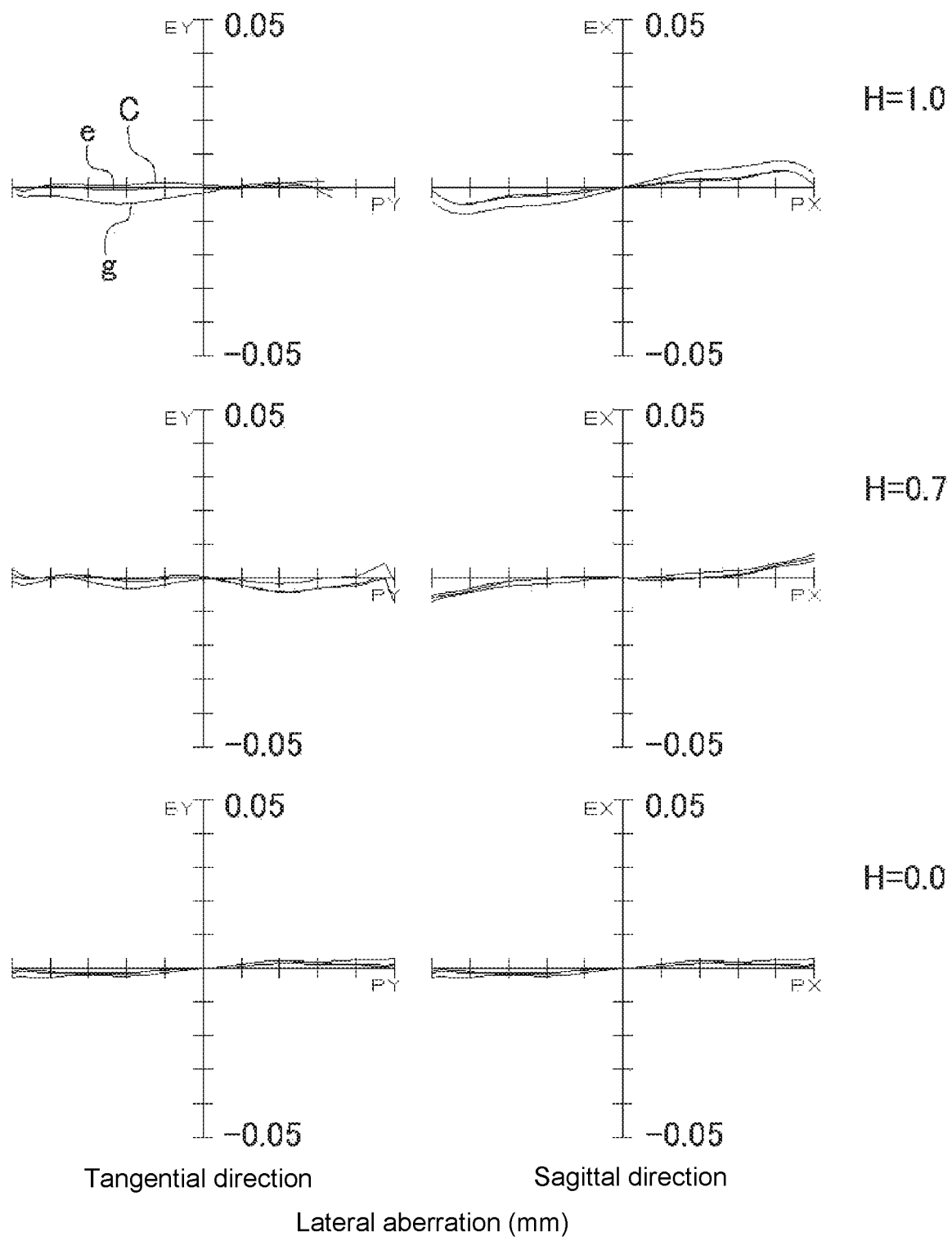
FIG. 14 is an aberration diagram showing a lateral aberration of the imaging lens of FIG. 13.
Figure 15:
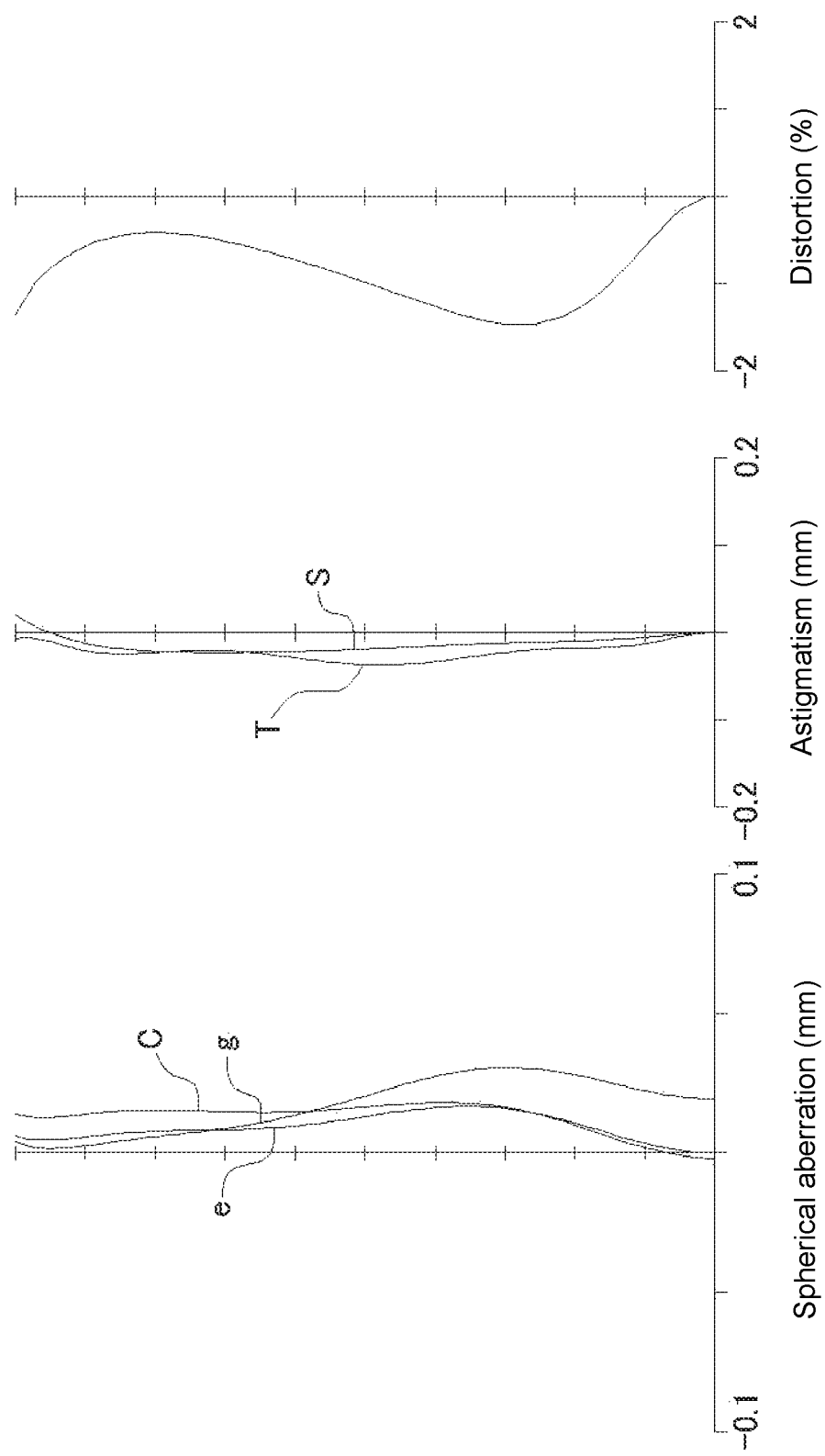
FIG. 15 is an aberration diagram showing a spherical aberration, astigmatism, and a distortion of the imaging lens of FIG. 13

FIG. 14 shows the lateral aberration that corresponds to the image height ratio H of the imaging lens of Numerical Data Example 5 and FIG. 15 shows a spherical aberration (mm), astigmatism (mm), and a distortion (%), respectively. As shown in FIGS. 14 and 15, according to the imaging lens of Numerical Data Example 5, the aberrations are satisfactorily corrected.

Figure 16:
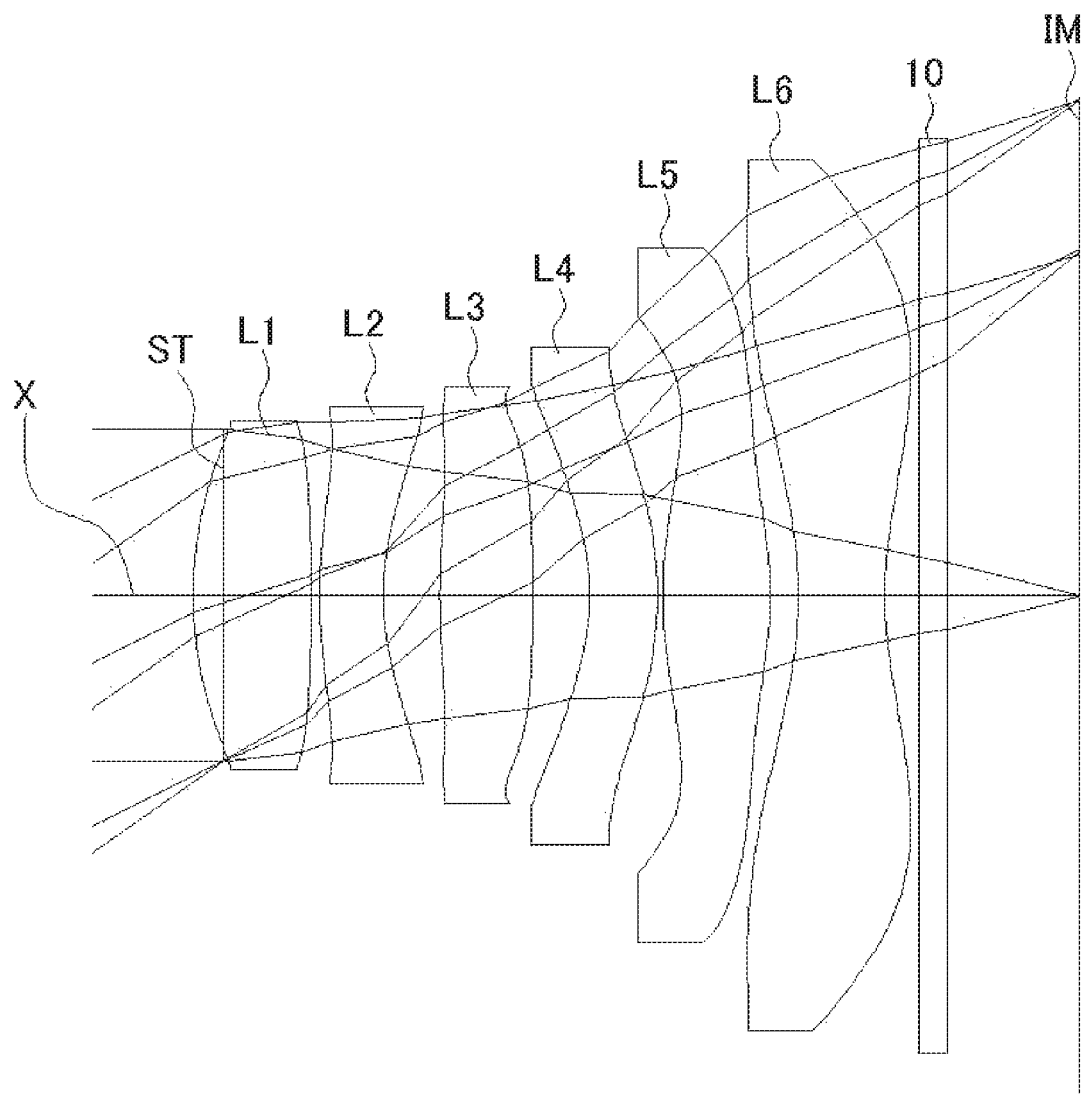
FIG. 16 shows a sectional view of a schematic configuration of an imaging lens in Numerical Data Example 6 according to the embodiment of the present invention.
Figure 19:
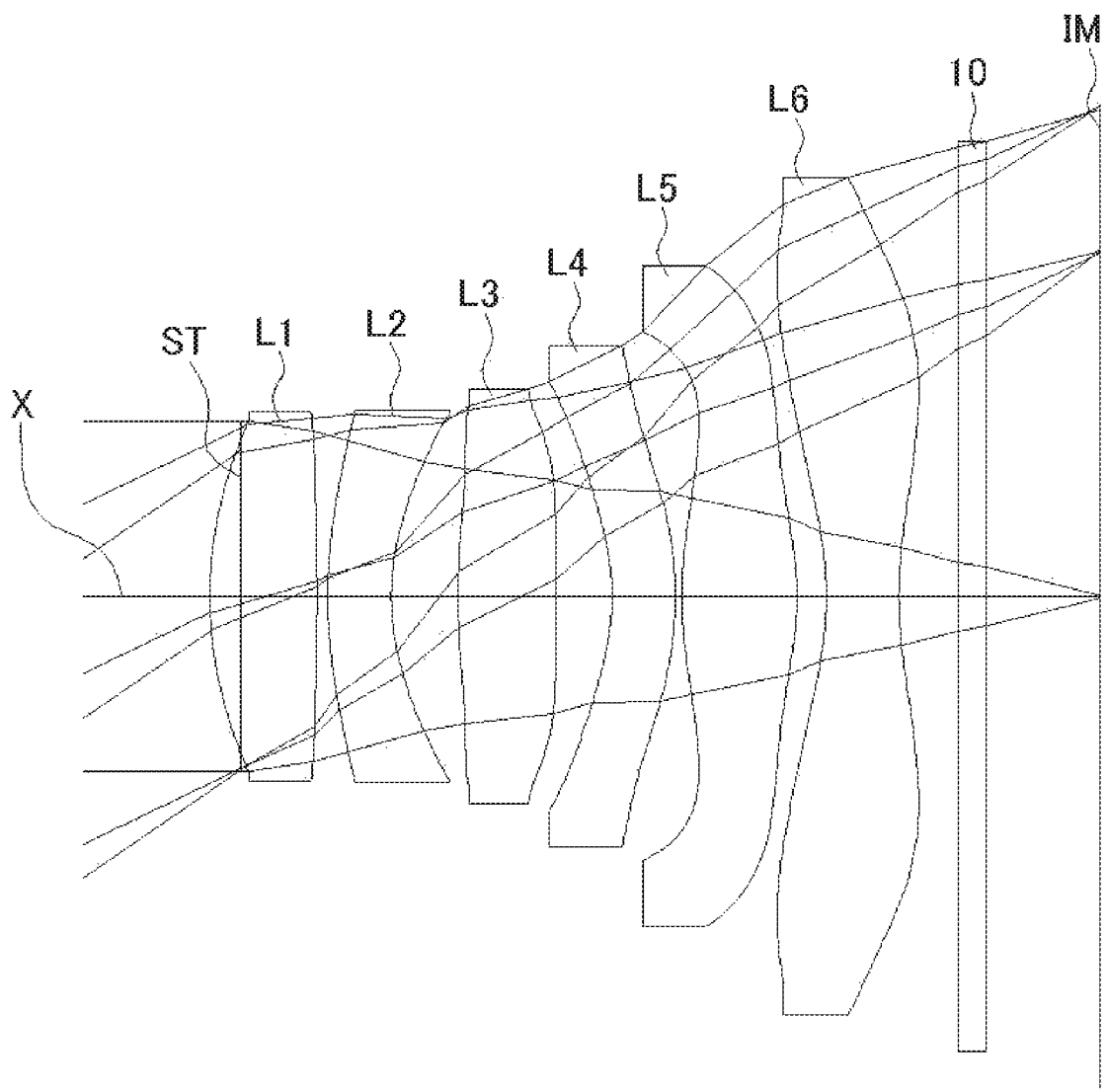
FIG. 19 shows a sectional view of a schematic configuration of an imaging lens in Numerical Data Example 7 according to the embodiment of the present invention.
Figure 22:
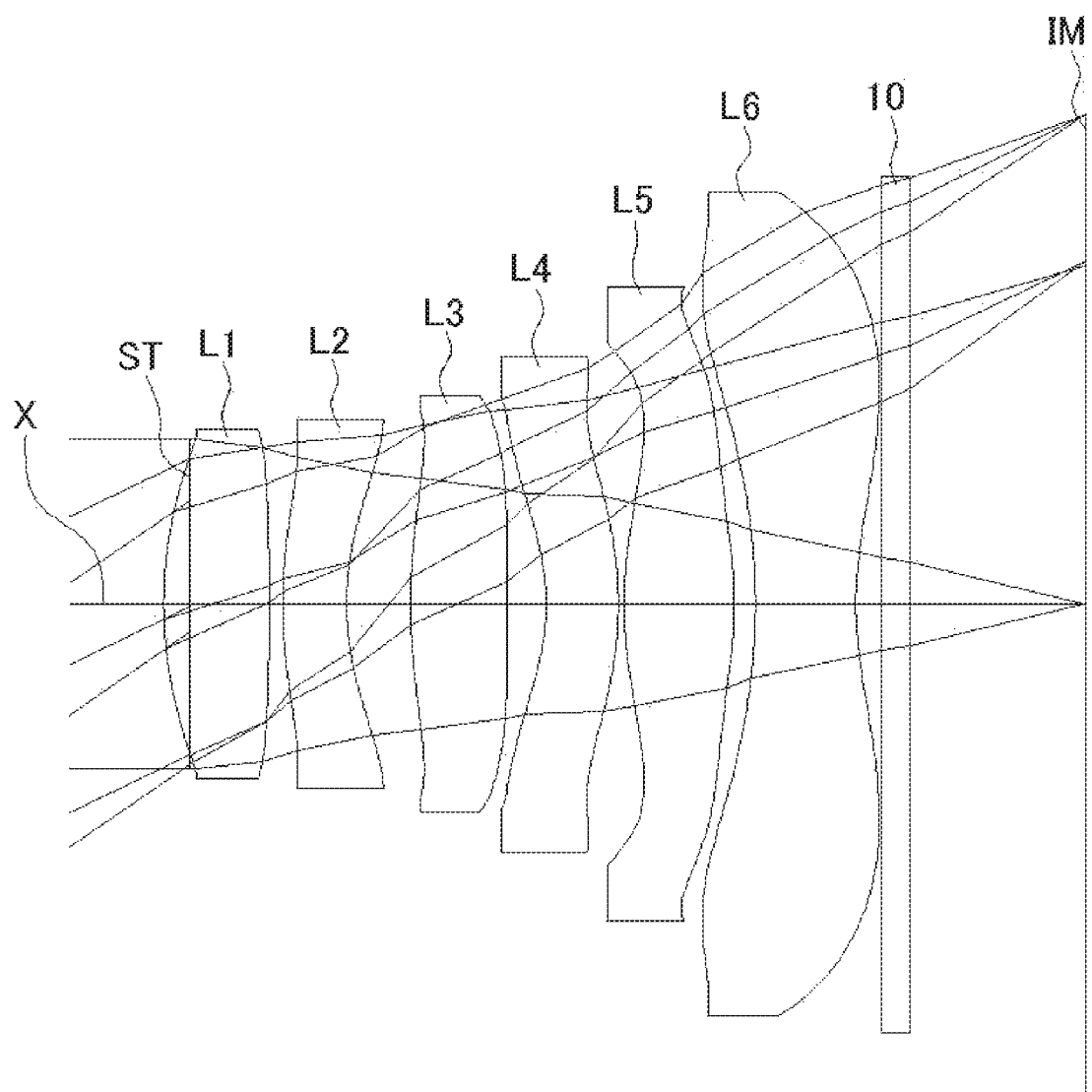
FIG. 22 shows a sectional view of a schematic configuration of an imaging lens in Numerical Data Example 8 according to the embodiment of the present invention.

As shown in FIGS. 16, 19, and 22, in the imaging lenses of Numerical Data Examples 6 to 8, the aperture stop ST is disposed on the object side of the first lens L1. This aperture stop ST can be disposed on the object side relative to a vertex tangential plane of the object-side surface of the first lens L1. Here, in the imaging lenses of Numerical Data Examples 6 to 8, the curvature radius of the object-side surface is taken as the curvature radius r2 and the curvature radius of the image plane-side surface is taken as the curvature radius r3.

Numerical Data Example 6

Basic lens data are shown below.
f = 3.47 mm, Fno = 2.1, ω = 35.7°
Unit: mm

Surface Data

| Surface Number i | r | d | nd | vd |
|---|---|---|---|---|
| (Object) | ∞ | ∞ | | |
| 1 (Stop) | ∞ | −0.150 | | |
| 2* | 1.922 | 0.589 | 1.5350 | 56.1 (=vd1) |
| 3* | −13.833 | 0.042 | | |
| 4* | 2.396 (=R2f) | 0.318 | 1.6355 | 24.0 (=vd2) |
| 5* | 1.331 (=R2r) | 0.282 | | |
| 6* | 3.827 | 0.464 | 1.5350 | 56.1 (=vd3) |
| 7* | −14.190 | 0.287 | | |
| 8* | −1.133 | 0.337 | 1.6355 | 24.0 (=vd4) |
| 9* | −1.899 | 0.027 | | |
| 10* | 1.932 | 0.538 | 1.5350 | 56.1 (=vd5) |
| 11* | −1.746 | 0.140 | | |
| 12* | −2.109 | 0.430 | 1.5350 | 56.1 (=vd6) |
| 13* | 1.765 | 0.170 | | |
| 14 | ∞ | 0.145 | 1.5168 | 64.2 |
| 15 (Image plane) | ∞ | 0.685 | | | f1 = 3.20 mm
f2 = −5.35 mm
f3 = 5.68 mm
f4 = −5.34 mm
f5 = 1.81 mm
f6 = −1.73 mm

Aspheric Surface Data

Second Surface k = 0.000, $A_4$ = −8.372E−04, $A_6$ = 3.222E−02, $A_8$ = −3.710E−01, $A_{10}$ = 9.753E−01, $A_{12}$ = −1.152, $A_{14}$ = 4.579E−01

Third Surface k = 0.000, $A_4$ = −8.737E−02, $A_6$ = 2.495E−01, $A_8$ = −5.841E−01, $A_{10}$ = 6.647E−01, $A_{12}$ = −5.936E−01, $A_{14}$ = 2.383E−01

Fourth Surface k = −3.591E+01, $A_4$ = −3.104E−02, $A_6$ = 4.152E−02, $A_8$ = 5.876E−02, $A_{10}$ = −4.794E−01, $A_{12}$ = 3.343E−01

Fifth Surface k = −5.121, $A_4$ = −5.003E−02, $A_6$ = 8.329E−02, $A_8$ = −1.184E−02, $A_{10}$ = −2.476E−01, $A_{12}$ = 1.674E−01

Sixth Surface k = 0.000, $A_4$ = −1.298E−01, $A_6$ = −6.014E−02, $A_8$ = −4.986E−02, $A_{10}$ = 1.150E−01, $A_{12}$ = 2.359E−02

Seventh Surface k = 0.000, $A_4$ = −8.535E−02, $A_6$ = 9.285E−03, $A_8$ = −3.300E−01, $A_{10}$ = 2.329E−01, $A_{12}$ = 7.564E−02

Eighth Surface k = 0.000, $A_4$ = 4.836E−01, $A_6$ = −3.244E−01, $A_8$ = 4.336E−02, $A_{10}$ = 1.295E−01, $A_{12}$ = 1.734E−02, $A_{14}$ = −2.172E−02

Ninth Surface k = −1.991E−01, $A_4$ = −3.706E−02, $A_6$ = 1.419E−01, $A_8$ = −2.192E−02, $A_{10}$ = −2.743E−02, $A_{12}$ = 1.052E−02

Tenth Surface k = −9.688, $A_4$ = −1.096E−01, $A_6$ = 5.499E−02, $A_8$ = −5.287E−02, $A_{10}$ = 5.087E−03, $A_{12}$ = 3.761E−03, $A_{14}$ = −4.067E−05

Eleventh Surface k = −1.592E+01, $A_4$ = 1.307E−01, $A_6$ = −6.968E−02, $A_8$ = 2.086E−03, $A_{10}$ = 3.349E−03, $A_{12}$ = 5.275E−04, $A_{14}$ = −2.942E−04

Twelfth Surface k = −9.191, $A_4$ = 6.745E−03, $A_6$ = 9.064E−03, $A_8$ = −1.192E−03, $A_{10}$ = −5.723E−04, $A_{12}$ = 1.291E−05, $A_{14}$ = 5.359E−05, $A_{16}$ = −7.482E−06

Thirteenth Surface k = −1.488E+01, $A_4$ = −5.052E−02, $A_6$ = 1.030E−02, $A_8$ = −3.739E−03, $A_{10}$ = 9.132E−05, $A_{12}$ = 1.210E−04, $A_{14}$ = 6.264E−06, $A_{16}$ = −3.257E−06

The values of the respective conditional expressions are as follows:

$f1/f2 = -0.60$ $f3/f = 1.64$ $R2r/R2f = 0.56$ $f4/f = -1.54$ $f5/f6 = -1.05$

Accordingly, the imaging lens of Numerical Data Example 6 satisfies the above-described respective conditional expressions. A distance on the optical axis X from the object-side surface of the first lens L1 to the image plane IM (length in air) is 4.40 mm, and downsizing of the imaging lens is attained.

Figure 17:
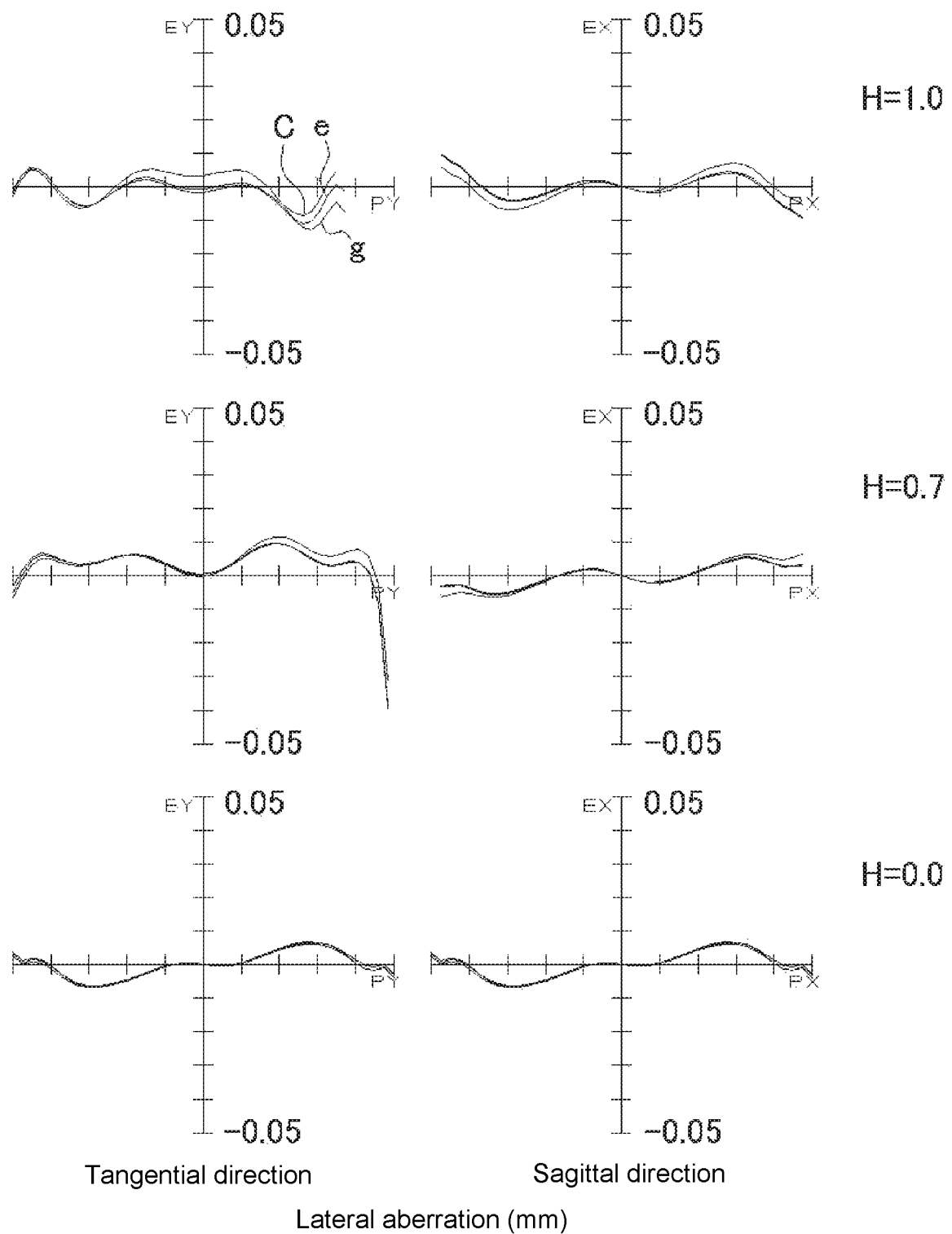
FIG. 17 is an aberration diagram showing a lateral aberration of the imaging lens of FIG. 16.
Figure 18:
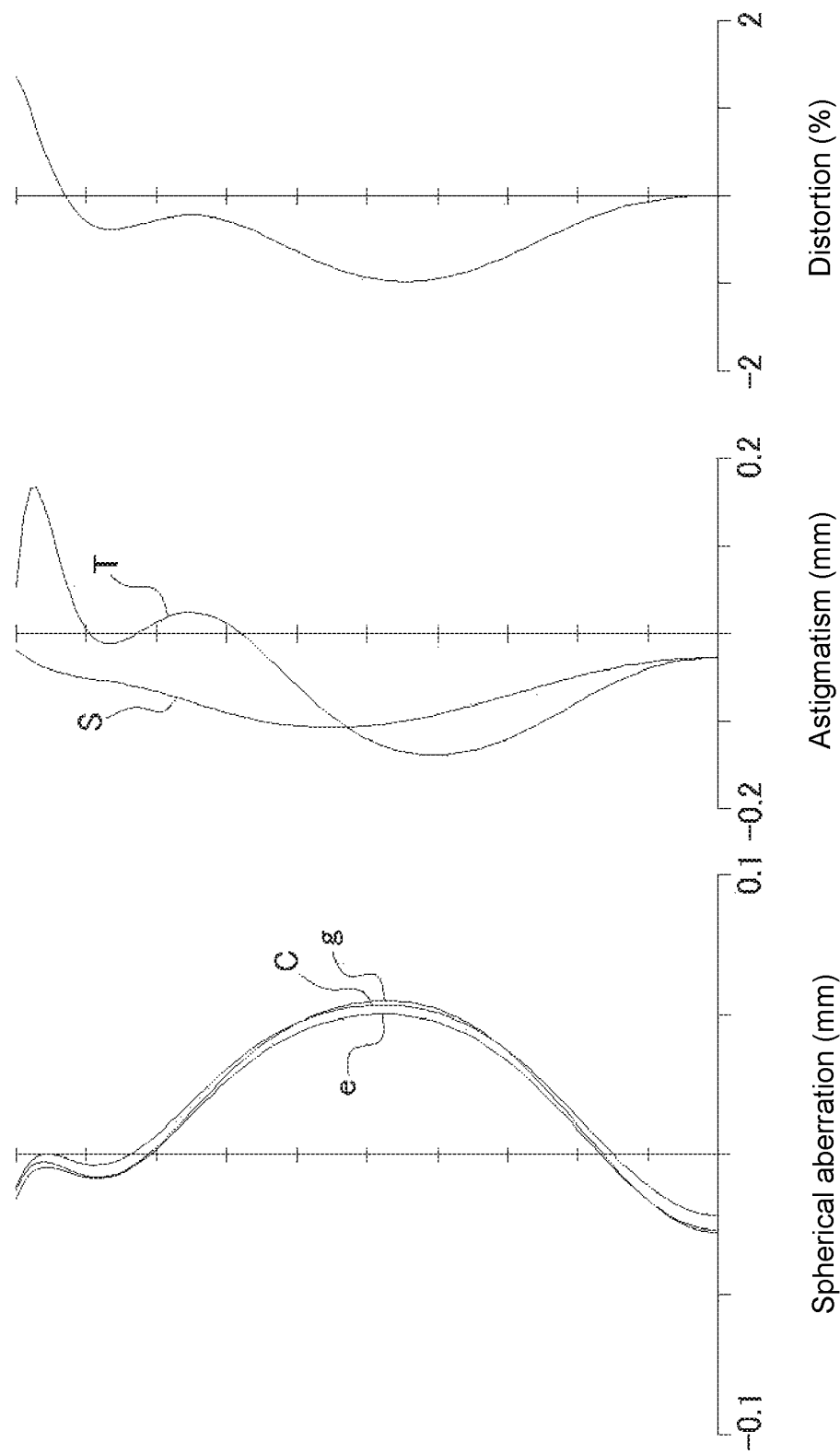
FIG. 18 is an aberration diagram showing a spherical aberration, astigmatism, and a distortion of the imaging lens of FIG. 16.

FIG. 17 shows the lateral aberration that corresponds to the image height ratio H of the imaging lens of Numerical Data Example 6 and FIG. 18 shows a spherical aberration (mm), astigmatism (mm), and a distortion (%), respectively.

As shown in FIGS. 17 and 18, according to the imaging lens of Numerical Data Example 6, the aberrations are satisfactorily corrected.

Numerical Data Example 7

Basic lens data are shown below.
f = 3.56 mm, Fno = 2.0, ω = 35.0°
Unit: mm

Surface Data

| Surface Number i | r | d | nd | vd |
|---|---|---|---|---|
| (Object) | ∞ | ∞ | | |
| 1 (Stop) | ∞ | −0.155 | | |
| 2* | 2.076 | 0.544 | 1.6097 | 57.7 (=vd1) |
| 3* | −15.344 | 0.054 | | |
| 4* | 2.269 (=R2f) | 0.323 | 1.6355 | 24.0 (=vd2) |
| 5* | 1.180 (=R2r) | 0.340 | | |
| 6* | 3.444 | 0.498 | 1.5350 | 56.1 (=vd3) |
| 7* | −109.703 | 0.284 | | |
| 8* | −1.169 | 0.320 | 1.6355 | 24.0 (=vd4) |
| 9* | −1.888 | 0.034 | | |
| 10* | 1.917 | 0.586 | 1.5350 | 56.1 (=vd5) |
| 11* | −1.425 | 0.148 | | |
| 12* | −1.525 | 0.368 | 1.5350 | 56.1 (=vd6) |
| 13* | 2.025 | 0.300 | | |
| 14 | ∞ | 0.145 | 1.5168 | 64.2 |
| 15 | ∞ | 0.574 | | |
| (Image plane) | ∞ | | | | f1 = 3.04 mm
f2 = −4.38 mm
f3 = 6.25 mm
f4 = −5.85 mm
f5 = 1.63 mm
f6 = −1.57 mm

Aspheric Surface Data

Second Surface k = 0.000, $A_4$ = 1.566E−02, $A_6$ = 2.088E−02, $A_8$ = −3.718E−01, $A_{10}$ = 9.770E−01, $A_{12}$ = −1.079, $A_{14}$ = 4.256E−01
Third Surface k = 0.000, $A_4$ = −3.948E−02, $A_6$ = 2.914E−01, $A_8$ = −6.289E−01, $A_{10}$ = 7.026E−01, $A_{12}$ = −5.161E−01, $A_{14}$ = 1.882E−01
Fourth Surface k = −2.866E+01, $A_4$ = 4.139E−02, $A_6$ = 2.968E−02, $A_8$ = 6.667E−02, $A_{10}$ = −4.295E−01, $A_{12}$ = 6.176E−01, $A_{14}$ = −4.948E−01, $A_{16}$ = 2.024E−01
Fifth Surface k = −3.892, $A_4$ = −4.570E−02, $A_6$ = 1.407E−01, $A_8$ = −8.084E−02, $A_{10}$ = 1.056E−01, $A_{12}$ = −1.748E−01, $A_{14}$ = −1.205E−02, $A_{16}$ = 1.090E−01
Sixth Surface k = 0.000, $A_4$ = −1.483E−01, $A_6$ = −6.069E−03, $A_8$ = −4.182E−02, $A_{10}$ = 1.155E−01, $A_{12}$ = 2.803E−02, $A_{14}$ = −1.337E−02, $A_{16}$ = −1.763E−02
Seventh Surface k = 0.000, $A_4$ = −8.940E−02, $A_6$ = 1.846E−02, $A_8$ = −2.639E−01, $A_{10}$ = 1.313E−01, $A_{12}$ = 1.293E−01, $A_{14}$ = −2.445E−02, $A_{16}$ = −2.722E−02

Eighth Surface k = 0.000, $A_4$ = 4.686E−01, $A_6$ = −3.065E−01, $A_8$ = 5.616E−02, $A_{10}$ = 8.099E−02, $A_{12}$ = 8.334E−03, $A_{14}$ = −1.510E−02
Ninth Surface k = −3.524E−01, $A_4$ = −1.793E−02, $A_6$ = 1.294E−01, $A_8$ = −2.717E−02, $A_{10}$ = −2.416E−02, $A_{12}$ = 8.365E−03
Tenth Surface k = −1.508E+01, $A_4$ = −9.813E−02, $A_6$ = 6.558E−02, $A_8$ = −5.815E−02, $A_{10}$ = −1.595E−03, $A_{12}$ = 1.065E−02, $A_{14}$ = −3.598E−03
Eleventh Surface k = −1.585E+01, $A_4$ = 1.326E−01, $A_6$ = −6.640E−02, $A_8$ = −4.585E−03, $A_{10}$ = 4.563E−03, $A_{12}$ = 6.051E−04, $A_{14}$ = −3.576E−04
Twelfth Surface k = −1.756E+01, $A_4$ = −4.052E−03, $A_6$ = 6.890E−03, $A_8$ = 1.628E−04, $A_{10}$ = −4.026E−04, $A_{12}$ = −2.141E−05, $A_{14}$ = 4.016E−05, $A_{16}$ = −5.913E−06
Thirteenth Surface k = −1.696E+01, $A_4$ = −6.286E−02, $A_6$ = 1.292E−02, $A_8$ = −3.637E−03, $A_{10}$ = 7.523E−05, $A_{12}$ = 1.650E−04, $A_{14}$ = 4.066E−06, $A_{16}$ = −4.436E−06

The values of the respective conditional expressions are as follows:

$f1/f2 = -0.69$ $f3/f = 1.76$ $R2r/R2f = 0.52$ $f4/f = -1.64$ $f5/f6 = -1.04$

Accordingly, the imaging lens of Numerical Data Example 7 satisfies the above-described respective conditional expressions. A distance on the optical axis X from the object-side surface of the first lens L1 to the image plane IM (length in air) is 4.47 mm, and downsizing of the imaging lens is attained.

Figure 20:
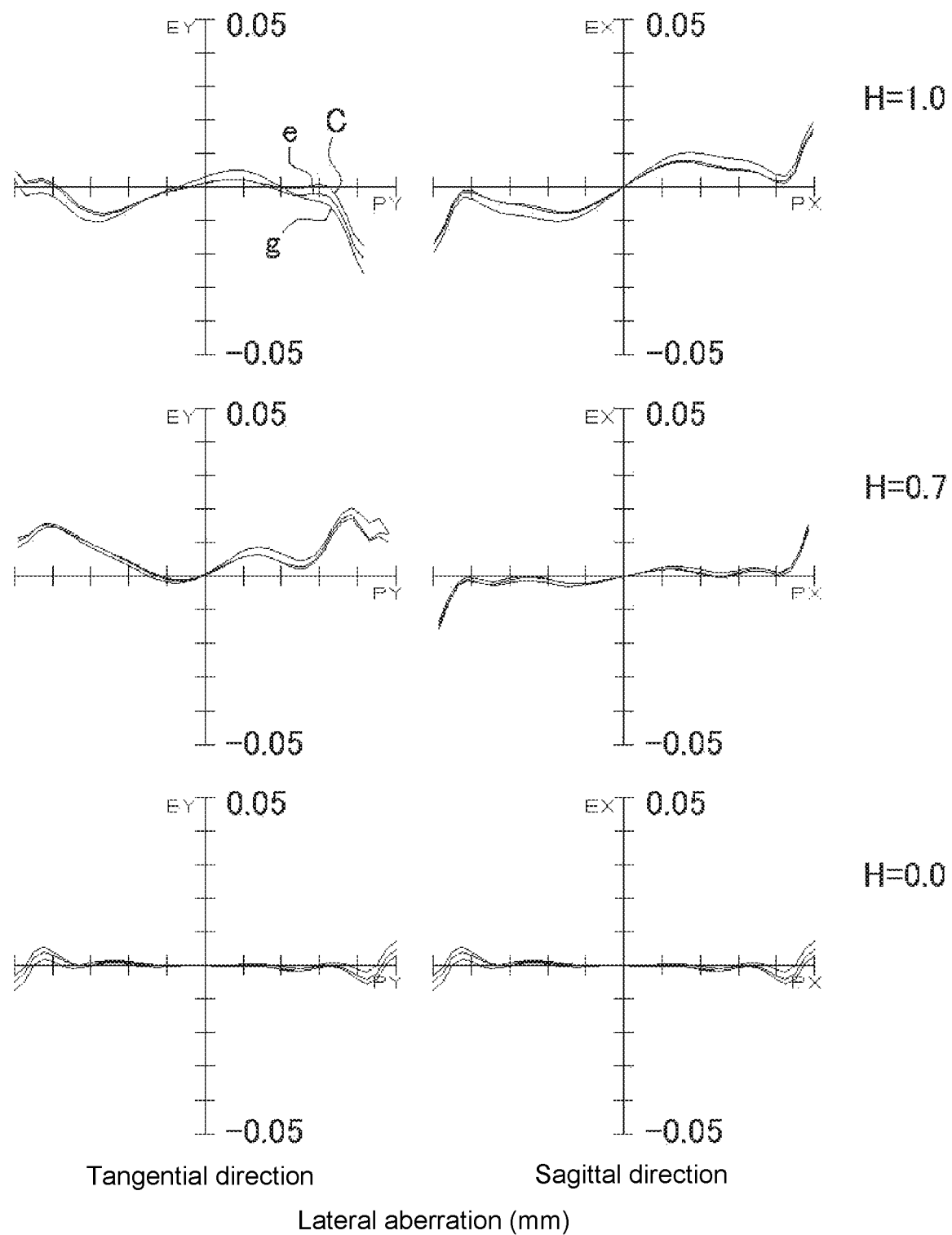
FIG. 20 is an aberration diagram showing a lateral aberration of the imaging lens of FIG. 19.
Figure 21:
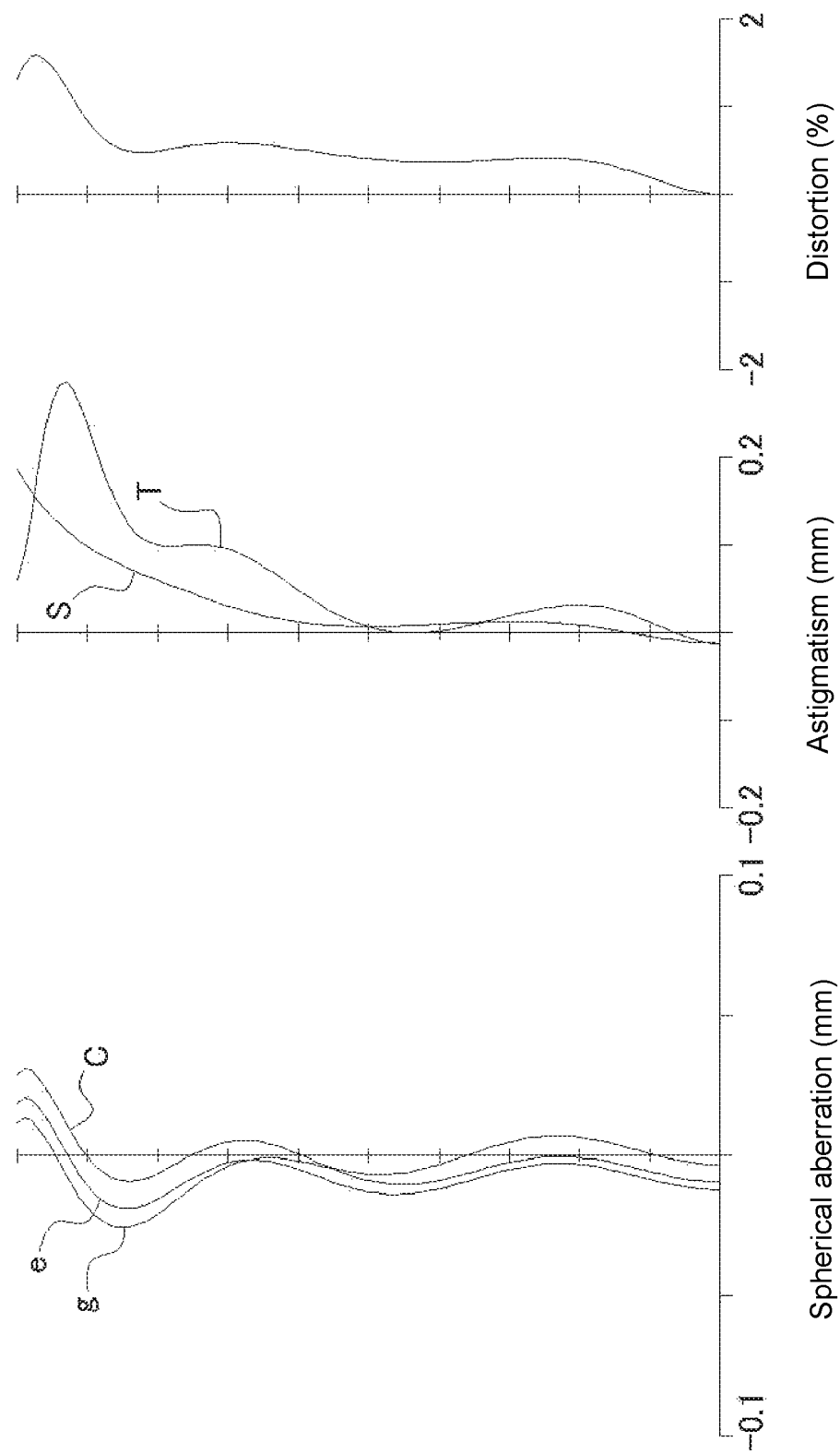
FIG. 21 is an aberration diagram showing a spherical aberration, astigmatism, and a distortion of the imaging lens of FIG. 19.

FIG. 20 shows the lateral aberration that corresponds to the image height ratio H of the imaging lens of Numerical Data 7 and FIG. 21 shows a spherical aberration (mm), astigmatism (mm), and a distortion (%), respectively. As shown in FIGS. 20 and 21, according to the imaging lens of Numerical Data Example 7, the aberrations are satisfactorily corrected.

Numerical Data Example 8

Basic lens data are shown below.
f = 3.56 mm, Fno = 2.1, ω = 35.0°
Unit: mm

Surface Data

| Surface Number i | r | d | nd | vd |
|---|---|---|---|---|
| (Object) | ∞ | ∞ | | |
| 1 (Stop) | ∞ | −0.130 | | |
| 2* | 2.171 | 0.536 | 1.5350 | 56.1 (=vd1) |

Basic lens data are shown below.
f = 3.56 mm, Fno = 2.1, ω = 35.0°
Unit: mm

| | | | | |
|---|---|---|---|---|
| 3* | −16.716 | 0.068 | | |
| 4* | 2.320 (=R2f) | 0.324 | 1.6355 | 24.0 (=vd2) |
| 5* | 1.345 (=R2r) | 0.326 | | |
| 6* | 2.849 | 0.493 | 1.5350 | 56.1 (=vd3) |
| 7* | −102.129 | 0.199 | | |
| 8* | −1.110 | 0.366 | 1.6355 | 24.0 (=vd4) |
| 9* | −1.971 | 0.029 | | |
| 10* | 1.932 | 0.560 | 1.5350 | 56.1 (=vd5) |
| 11* | −1.937 | 0.107 | | |
| 12* | −3.634 | 0.511 | 1.5350 | 56.1 (=vd6) |
| 13* | 1.671 | 0.130 | | |
| 14 | ∞ | 0.145 | 1.5168 | 64.2 |
| 15 (Image plane) | ∞ | 0.895 | | | f1 = 3.63 mm
f2 = −5.79 mm
f3 = 5.19 mm
f4 = −4.78 mm
f5 = 1.90 mm
f6 = −2.07 mm

Aspheric Surface Data

Second Surface k = 0.000, $A_4$ = −7.783E−03, $A_6$ = 7.620E−02, $A_8$ = −3.686E−01, $A_{10}$ = 8.500E−01, $A_{12}$ = −1.015, $A_{14}$ = 4.390E−01

Third Surface k = 0.000, $A_4$ = −5.979E−02, $A_6$ = 2.750E−01, $A_8$ = −6.564E−01, $A_{10}$ = 6.601E−01, $A_{12}$ = −5.199E−01, $A_{14}$ = 2.507E−01

Fourth Surface k = −2.876E+01, $A_4$ = 5.087E−02, $A_6$ = −1.171E−01, $A_8$ = 1.793E−01, $A_{10}$ = −5.658E−01, $A_{12}$ = 4.080E−01

Fifth Surface k = −5.319, $A_4$ = −3.335E−02, $A_6$ = 1.622E−01, $A_8$ = −3.286E−01, $A_{10}$ = 1.376E−01, $A_{12}$ = −7.740E−02, $A_{14}$ = 5.504E−02, $A_{16}$ = 1.640E−02

Sixth Surface k = 0.000, $A_4$ = −1.151E−01, $A_6$ = 3.794E−03, $A_8$ = 5.356E−02, $A_{10}$ = −1.007E−01, $A_{12}$ = 2.535E−02

Seventh Surface k = 0.000, $A_4$ = −7.498E−02, $A_6$ = 7.839E−02, $A_8$ = −2.250E−01, $A_{10}$ = 6.004E−02, $A_{12}$ = 9.249E−02, $A_{14}$ = 5.964E−02, $A_{16}$ = −8.689E−02

Eighth Surface k = 0.000, $A_4$ = 4.826E−01, $A_6$ = −1.856E−01, $A_8$ = 1.117E−01, $A_{10}$ = 3.185E−02, $A_{12}$ = −6.741E−02, $A_{14}$ = 4.585E−02

Ninth Surface k = −1.101, $A_4$ = −3.279E−02, $A_6$ = 1.545E−01, $A_8$ = 1.219E−03, $A_{10}$ = −3.334E−02, $A_{12}$ = 2.019E−03

Tenth Surface k = −5.408, $A_4$ = −1.433E−01, $A_6$ = 9.097E−02, $A_8$ = −6.151E−02, $A_{10}$ = −3.529E−03, $A_{12}$ = 4.316E−03, $A_{14}$ = 1.057E−03

Eleventh Surface k = −2.514E+01, $A_4$ = 9.315E−02, $A_6$ = −5.986E−02, $A_8$ = −7.744E−03, $A_{10}$ = 7.412E−03, $A_{12}$ = −4.403E−04, $A_{14}$ = 4.173E−05

Twelfth Surface k = −5.128E−01, $A_4$ = −2.589E−02, $A_6$ = 1.454E−02, $A_8$ = 3.123E−03, $A_{10}$ = −1.086E−03, $A_{12}$ = −7.293E−05, $A_{14}$ = 4.243E−05, $A_{16}$ = −4.097E−06

Thirteenth Surface k = −1.625E+01, $A_4$ = −6.236E−02, $A_6$ = 1.459E−02, $A_8$ = −3.800E−03, $A_{10}$ = 3.424E−04, $A_{12}$ = 8.079E−05, $A_{14}$ = −2.832E−05, $A_{16}$ = 2.256E−06

The values of the respective conditional expressions are as follows:

$f1/f2 = -0.63$ $f3/f = 1.46$ $R2r/R2f = 0.58$ $f4/f = -1.34$ $f5/f6 = -0.92$

Accordingly, the imaging lens of Numerical Data Example 8 satisfies the above-described respective conditional expressions. A distance on the optical axis X from the object-side surface of the first lens L1 to the image plane IM (length in air) is 4.64 mm, and downsizing of the imaging lens is attained.

Figure 23:
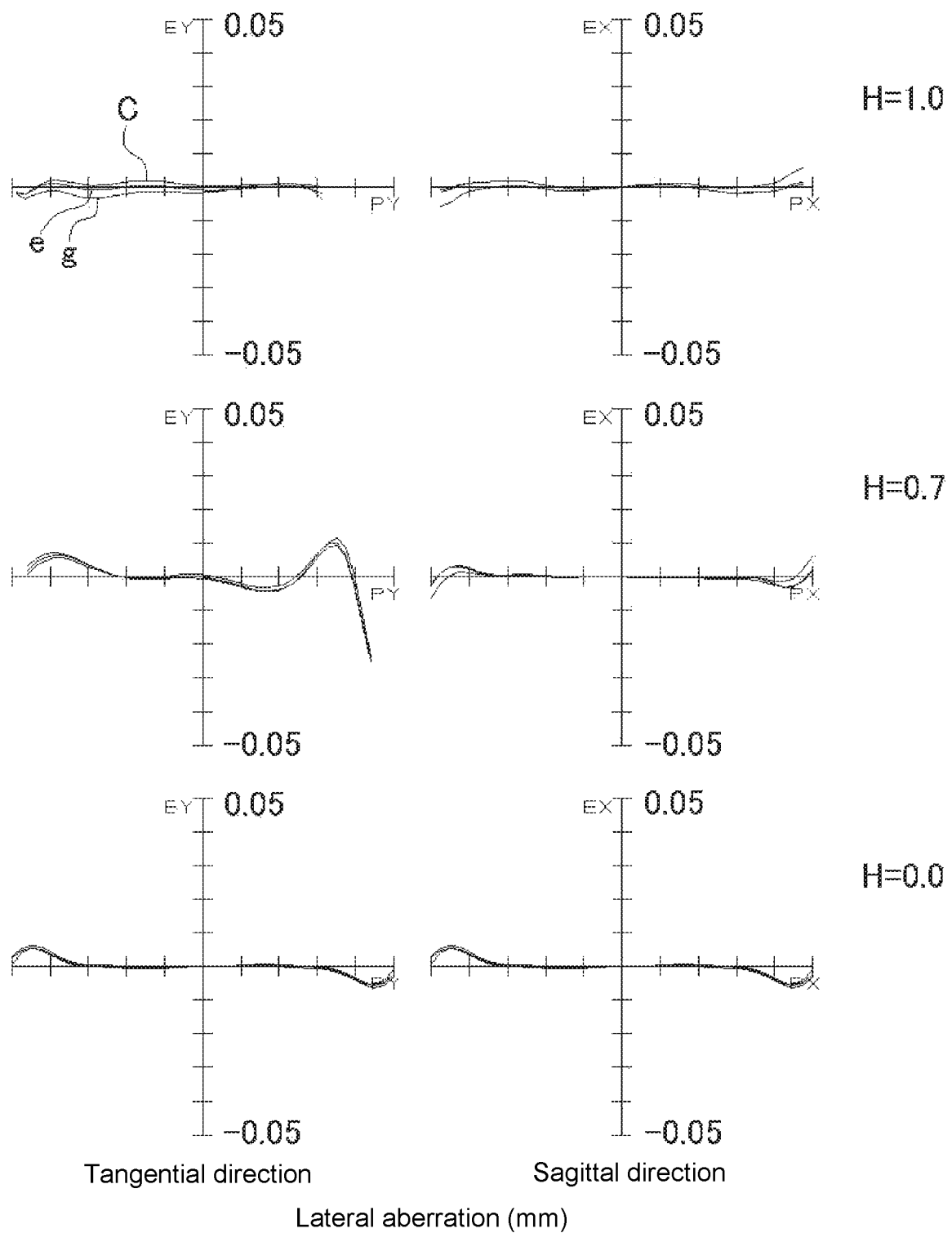
FIG. 23 is an aberration diagram showing a lateral aberration of the imaging lens of FIG. 22.
Figure 24:
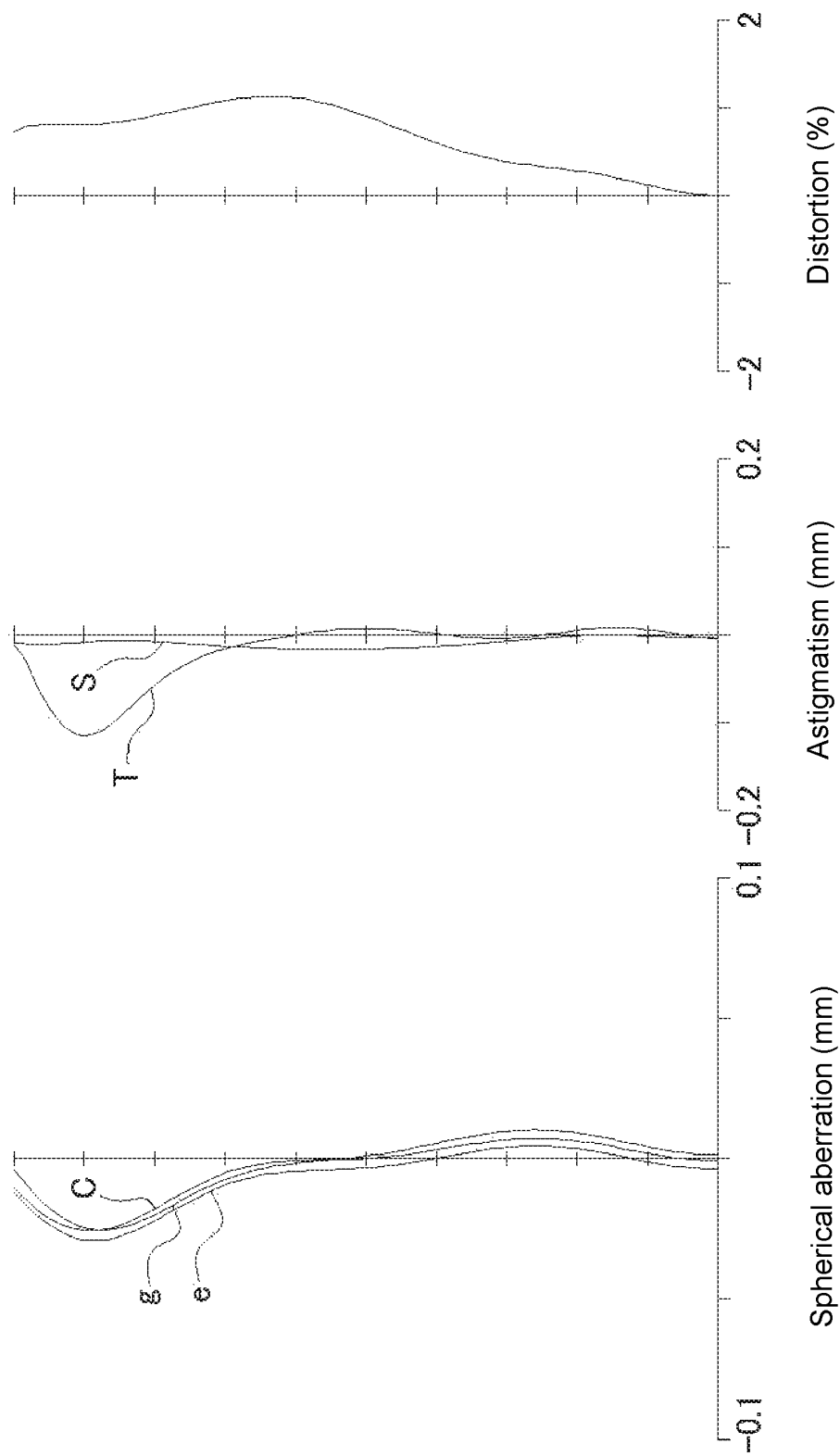
FIG. 24 is an aberration diagram showing a spherical aberration, astigmatism, and a distortion of the imaging lens of FIG. 22.

FIG. 23 shows the lateral aberration that corresponds to the image height ratio H of the imaging lens of Numerical Data Example 8 and FIG. 24 shows a spherical aberration (mm), astigmatism (mm), and a distortion (%), respectively. As shown in FIGS. 23 and 24, according to the imaging lens of Numerical Data Example 8, the aberrations are satisfactorily corrected.

According to the imaging lens of the embodiment described above, it is possible to achieve about 70° of an angle of view (2ω). For reference, the angles of view of the imaging lenses in Numerical Data Examples 1 to 8 are as wide as from 58.4° to 71.4°. According to the imaging lens of the embodiment, it is possible to take an image in wider range than a conventional imaging lens.

In addition, in these years, for a purpose of improving camera performances, high pixel count imaging element is often combined with an imaging lens. In case of such high pixel count imaging element, since a light-receiving area of each pixel is less, an image taken tends to be dark. As a method of correcting this issue, there is a method of improving light sensitivity of an imaging element with an electrical circuit. However, when the light sensitivity increases, a noise component that directly does not contribute to image formation is also amplified, so that another circuit to reduce noises is necessary. In the imaging lenses of Numerical Data Examples 1 to 8, Fno is very small, 2.0 to 2.5. According to the imaging lens of the embodiment, it is possible to sufficiently bright image without the above-described electrical circuit.

Therefore, when the imaging lens of the embodiment is mounted in an imaging optical system, which includes built-in cameras of portable devices such as cellular phones, portable information terminals, and smartphones, digital still cameras, security cameras, onboard cameras, and network cameras, it is possible to attain both high functionality and downsizing of the cameras.

The present invention is applicable in an imaging lens for mounting in a relatively small camera such as built-in cameras of portable devices including cellular phones, smartphones, and portable information terminals, digital still cameras, security cameras, onboard cameras, and network cameras.

The disclosure of Japanese Patent Applications No. 2012-139323, filed on Jun. 21, 2012, and No. 2012-245956, filed on Nov. 8, 2012, is incorporated in the application by reference.

While the invention has been explained with reference to the specific embodiments of the invention, the explanation is illustrative and the invention is limited only by the appended claims.

What is claimed is:

1. An imaging lens comprising:
   a first lens having positive refractive power;
   a second lens;
   a third lens;
   a fourth lens;
   a fifth lens having positive refractive power; and
   a sixth lens having negative refractive power, arranged in this order from an object side to an image plane side,
   wherein said fourth lens is formed in a shape so that a surface thereof on the object side is concave near an optical axis thereof and a surface thereof on the image plane side is convex near the optical axis thereof,
   said fifth lens is formed in a shape so that a surface thereof on the object side and a surface thereof on the image plane side are convex near an optical axis thereof,
   said sixth lens is formed in a shape so that a surface thereof on the object side and a surface thereof on the image plane side are concave near an optical axis thereof, and
   said fifth lens has a focal length f5, said sixth lens has a focal length f6, and said fourth lens has an Abbe's number vd4 so that the following conditional expression is satisfied:

$-2.0 < f5/f6 < -0.5$, $20 < vd4 < 40$.

2. The imaging lens according to claim 1, wherein said first lens has a focal length f1 and said second lens has a focal length f2 so that the following conditional expression is satisfied:

$-1.5 < f1/f2 < -0.4$.

3. The imaging lens according to claim 1, wherein said third lens has a focal length f3 so that the following conditional expression is satisfied:

$0.5 < f3/f < 2.0$, where f is a focal length of a whole lens system.

4. The imaging lens according to claim 1, wherein said second lens is formed in a shape so that a surface thereof on the object side has a curvature radius R2f and a surface thereof on the image plane side has a curvature radius R2r so that the following conditional expression is satisfied:

$0.4 < R2r/R2f < 0.8$.

5. The imaging lens according to claim 1, wherein said fourth lens has a focal length f4 so that the following conditional expression is satisfied:

$-5.0 < f4/f < -1.0$, where f is a focal length of a whole lens system.

6. An imaging lens comprising:
   a first lens;
   a second lens;
   a third lens;
   a fourth lens;
   a fifth lens having positive refractive power; and
   a sixth lens having negative refractive power, arranged in this order from an object side to an image plane side,
   wherein said sixth lens is formed in a shape so that a surface thereof on the image plane side is concave near an optical axis thereof, and
   said third lens has a focal length f3, said fourth lens has a focal length f4, and said second lens is formed in a shape so that a surface thereof on the object side has a curvature radius R2f and a surface thereof on the image plane side has a curvature radius R2r so that the following conditional expressions are satisfied:

$0.5 < f3/f < 2.0$, $-5.0 < f4/f < -1.0$, $0.4 < R2r/R2f < 0.8$, where f is a focal length of a whole lens system.

7. The imaging lens according to claim 6, wherein said first lens has a focal length f1 and said second lens has a focal length f2 so that the following conditional expression is satisfied:

$-1.5 < f1/f2 < -0.4$.

8. The imaging lens according to claim 6, wherein said fifth lens has a focal length f5 and said sixth lens has a focal length f6 so that the following conditional expression is satisfied:

$-2.0 < f5/f6 < -0.5$.

* * * * *

UNITED STATES PATENT AND TRADEMARK OFFICE
CERTIFICATE OF CORRECTION

PATENT NO. : 10,754,126 B2
APPLICATION NO. : 16/427463
DATED : August 25, 2020
INVENTOR(S) : Yoji Kubota et al.

It is certified that error appears in the above-identified patent and that said Letters Patent is hereby corrected as shown below:

In the Claims

Column 26, Line 37, Claim 6:
Error: $-5.0 f4/f <-1.0$
Correction: $-5.0 < f4/f < -1.0$ Signed and Sealed this
Sixth Day of October, 2020

Andrei Iancu
*Director of the United States Patent and Trademark Office*